US010852817B1

(12) United States Patent
Ouderkirk et al.

(10) Patent No.: US 10,852,817 B1
(45) Date of Patent: Dec. 1, 2020

(54) EYE TRACKING COMBINER HAVING MULTIPLE PERSPECTIVES

(71) Applicant: Facebook Technologies, LLC, Menlo Park, CA (US)

(72) Inventors: Andrew John Ouderkirk, Kirkland, WA (US); Robert Dale Cavin, Seattle, WA (US); Alexander Jobe Fix, Seattle, WA (US); Ying Geng, Bellevue, WA (US); Elias Daniel Guestrin, Redmond, WA (US); Karol Constantine Hatzilias, Kenmore, WA (US); Robin Sharma, Redmond, WA (US); Yusufu Njoni Bamaxam Sulai, Bothell, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 21 days.

(21) Appl. No.: 16/179,656

(22) Filed: Nov. 2, 2018

(51) Int. Cl.
*G06F 3/01* (2006.01)
*G02B 27/01* (2006.01)
*G06T 7/73* (2017.01)

(52) U.S. Cl.
CPC .......... *G06F 3/013* (2013.01); *G02B 27/0172* (2013.01); *G02B 27/0179* (2013.01); *G02B 2027/014* (2013.01); *G02B 2027/0138* (2013.01); *G02B 2027/0187* (2013.01); *G06T 7/74* (2017.01)

(58) Field of Classification Search
CPC .............. H04N 13/344; G02B 27/0093; G02B 2027/0138; G02B 2027/0178; G02B 27/0172; G02F 1/31; G06F 3/013
See application file for complete search history.

(56) References Cited

U.S. PATENT DOCUMENTS

| 6,433,760 | B1 | 8/2002 | Vaissie et al. |
| 7,522,344 | B1 | 4/2009 | Curatu et al. |
| 9,459,451 | B2 | 10/2016 | Saarikko et al. |
| 9,555,589 | B1 | 1/2017 | Ambur et al. |
| 9,658,453 | B1 | 5/2017 | Kress et al. |
| 9,791,924 | B2 | 10/2017 | Shiu et al. |
| 10,423,222 | B2 | 9/2019 | Popovich et al. |

(Continued)

OTHER PUBLICATIONS

U.S. Appl. No. 16/107,395, "Non-Final Office Action", dated Mar. 27, 2019, 10 pages.

(Continued)

*Primary Examiner* — Abbas I Abdulselam
(74) *Attorney, Agent, or Firm* — Weaver Austin Villeneuve & Sampson LLP

(57) ABSTRACT

Techniques for eye-tracking in a near-eye display system are disclosed. One example of a near-eye display system includes a waveguide-based display substrate transparent to visible light and configured to be placed in front of a user's eye. The waveguide-based display substrate includes a first light deflector configured to direct a first portion of invisible light reflected by the user's eye to a camera to form a first image of the user's eye in a first area of an image frame, and a second light deflector configured to direct a second portion of the invisible light reflected by the user's eye to the camera to form a second image of the user's eye in a second area of the image frame.

20 Claims, 19 Drawing Sheets

(56) References Cited

U.S. PATENT DOCUMENTS

| | | | |
|---|---|---|---|
| 2002/0154292 A1* | 10/2002 | Fukuma | G01M 11/0235 356/127 |
| 2008/0068836 A1* | 3/2008 | Hatanaka | G02B 6/0028 362/231 |
| 2008/0291951 A1 | 11/2008 | Konttinen et al. | |
| 2010/0149073 A1 | 6/2010 | Chaum et al. | |
| 2013/0063550 A1 | 3/2013 | Ritchey et al. | |
| 2013/0107214 A1* | 5/2013 | Blixt | A61B 3/113 351/210 |
| 2014/0285429 A1 | 9/2014 | Simmons | |
| 2015/0219899 A1 | 8/2015 | Mack et al. | |
| 2016/0077338 A1 | 3/2016 | Robbins et al. | |
| 2016/0274659 A1* | 9/2016 | Caraffi | G06F 1/325 |
| 2017/0082858 A1 | 3/2017 | Klug et al. | |
| 2017/0090562 A1 | 3/2017 | Gustafsson et al. | |
| 2017/0177075 A1* | 6/2017 | Zhang | G06T 7/20 |
| 2017/0205877 A1 | 7/2017 | Qin | |
| 2017/0285337 A1 | 10/2017 | Wilson et al. | |
| 2017/0285741 A1 | 10/2017 | Park et al. | |
| 2017/0299869 A1 | 10/2017 | Urey et al. | |
| 2018/0045960 A1 | 2/2018 | Palacios et al. | |
| 2018/0113508 A1 | 4/2018 | Berkner-Cieslicki et al. | |
| 2018/0275409 A1 | 9/2018 | Gao et al. | |
| 2019/0129174 A1 | 5/2019 | Perreault | |
| 2019/0258062 A1 | 8/2019 | Aleem et al. | |
| 2019/0286228 A1* | 9/2019 | Sangu | A61B 3/15 |
| 2019/0364228 A1* | 11/2019 | Larsen | G06K 9/00604 |

OTHER PUBLICATIONS

U.S. Appl. No. 16/107,395, "Final Office Action", dated Sep. 6, 2019, 7 pages.

U.S. Appl. No. 16/179,650, "Non-Final Office Action", dated Oct. 28, 2019, 16 pages.

U.S. Appl. No. 16/107,395, "Non-Final Office Action", dated Dec. 19, 2019, 11 pages.

U.S. Appl. No. 15/785,222, "Non-Final Office Action", dated Nov. 19, 2018, 20 pages.

U.S. Appl. No. 15/785,217, "Final Office Action", dated May 15, 2020, 17 pages.

U.S. Appl. No. 16/107,395, "Notice of Allowance", dated May 13, 2020, 8 pages.

U.S. Appl. No. 16/107,395, "Notice of Allowance", dated Jul. 9, 2020, 8 pages.

U.S. Appl. No. 15/785,217, "Non-Final Office Action", dated Feb. 6, 2020, 13 pages.

U.S. Appl. No. 15/785,219, "Non-Final Office Action", dated Jan. 27, 2020, 16 pages.

U.S. Appl. No. 16/179,650, "Notice of Allowance", dated Mar. 19, 2020, 8 pages.

U.S. Final Office Action dated Aug. 24, 2020, in U.S. Appl. No. 15/785,219.

Response to Final Office Action filed Oct. 22, 2020, in U.S. Appl. No. 15/785,219.

* cited by examiner

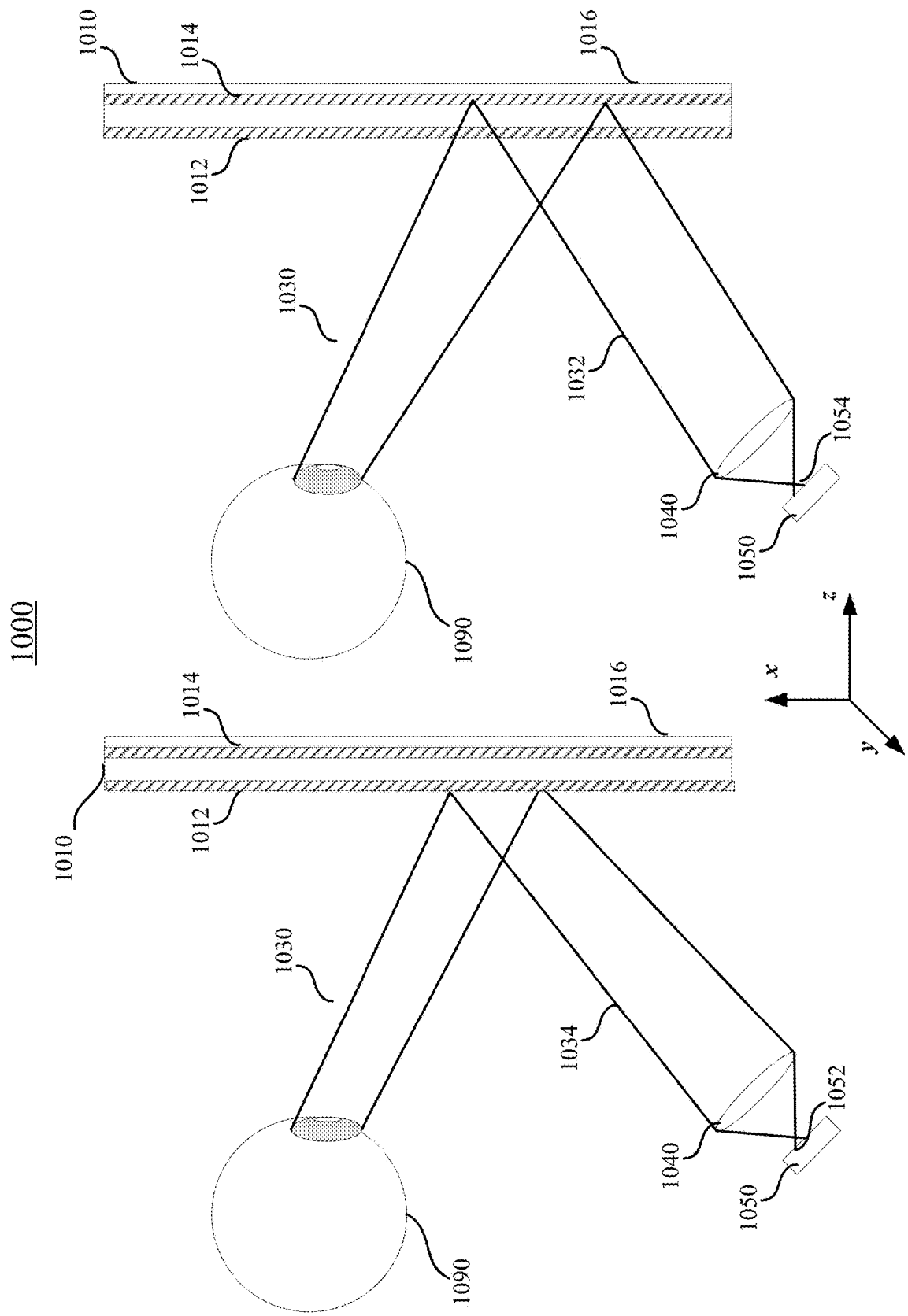

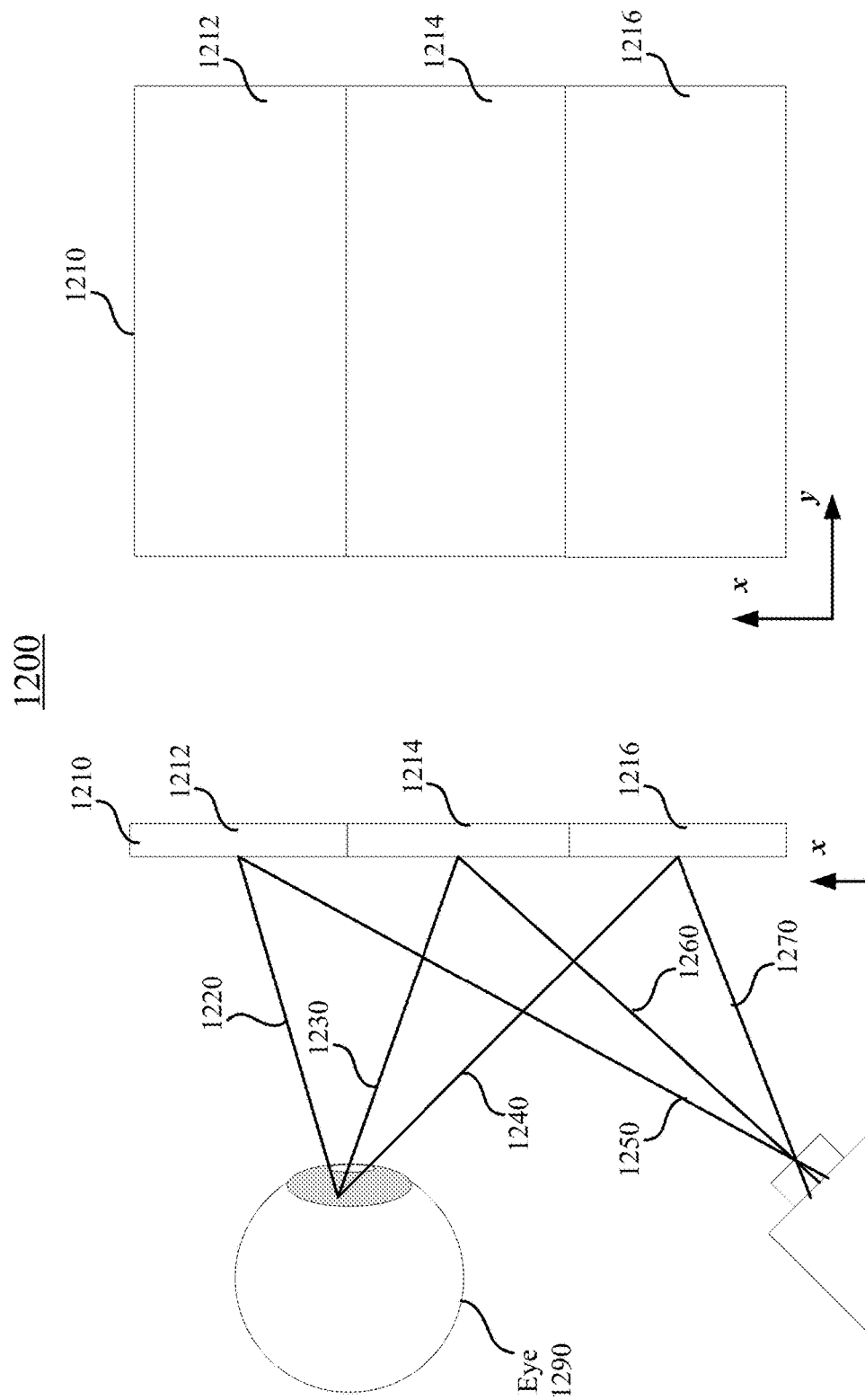

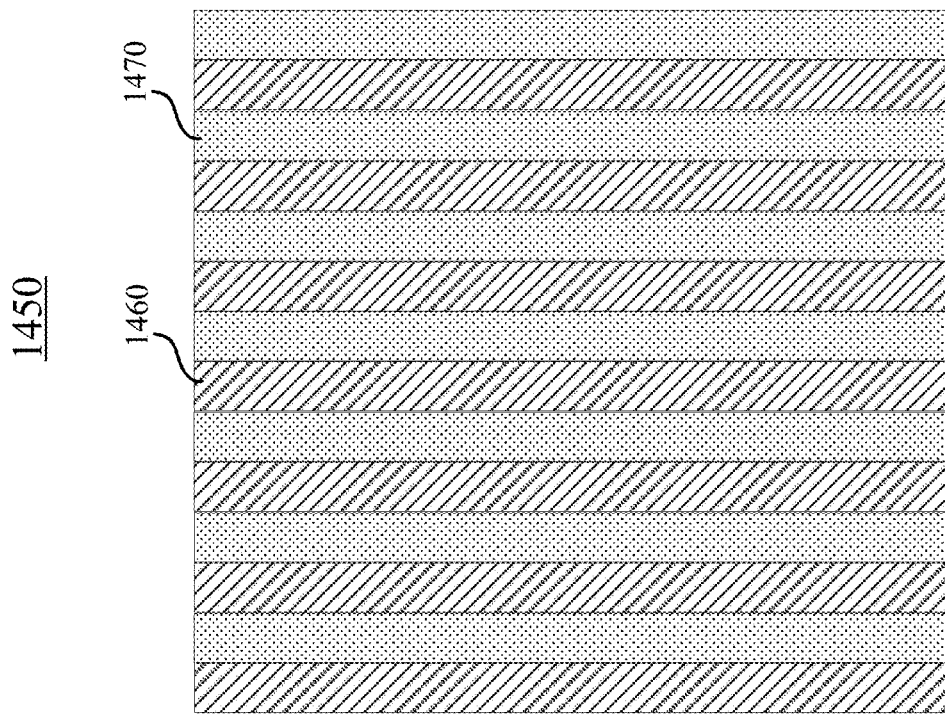
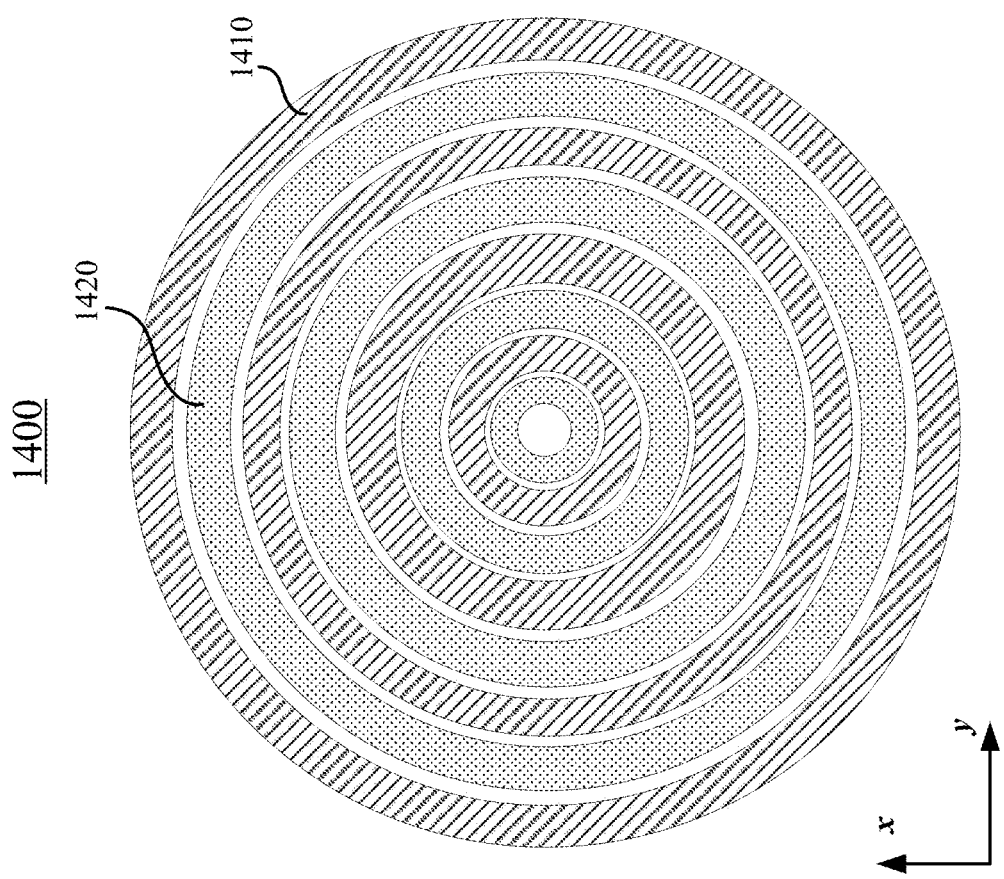
FIG. 14B
FIG. 14A

EYE TRACKING COMBINER HAVING MULTIPLE PERSPECTIVES

BACKGROUND

An artificial reality system, such as a head-mounted display (IMD) or heads-up display (HUD) system, generally includes a near-eye display system in the form of a headset or a pair of glasses and configured to present content to a user via an electronic or optic display within, for example, about 10-20 mm in front of the user's eyes. The near-eye display system may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through).

To provide a more immersive artificial reality experience, some artificial reality systems may include an input device for receiving user inputs, such as hand and/or finger movements. Additionally or alternatively, artificial reality systems can employ eye-tracking systems that can track the user's eye (e.g., gaze direction). The artificial reality systems may then employ the gaze direction information and/or information gained from the input device to modify or generate content based on the direction in which the user is looking, thereby providing a more immersive experience for the user. Eye-tracking systems can also be used for foveated rendering, foveated compression and transmission of image data, alertness monitoring, etc.

SUMMARY

This disclosure relates generally to eye tracking in near-eye display systems. According to certain embodiments, an eye-imaging unit for eye tracking may include one or more light sources configured to illuminate a user's eye, at least one camera for capturing images of the user's eye, and a substrate including two or more light deflectors that are configured to direct light reflected by the user's eye to the camera at different angles to form two or more images of the user's eye in a same image frame.

In one embodiment, the two or more light deflectors may include any combination of Fresnel lenses with reflective coating, Fresnel mirrors, tilted concave or flat mirrors (e.g., dichroic mirrors, such as hot mirrors through which the visible light may be transmitted substantially unaffected, whereas the near infrared light or infrared light may be reflected), reflective gratings, diffractive optical elements (DOEs), holographic optical elements (HOEs), reflective thin film coatings, etc. The two or more light deflectors may be in different areas of a same surface of the substrate, on different surfaces of the substrate, on different layers of the substrate, or any combination thereof. The two or more light deflectors may deflect light reflected by the user's eye towards the camera at different directions, and thus the camera may capture at least two images of the user's eye from different perspectives for more accurate eye tracking.

In some embodiments, an eye-tracking system may include one or more light sources configured to emit light invisible to a user's eye for illuminating the user's eye, a camera configured to detect the light invisible to the user's eye, and a substrate transparent to visible light and configured to be placed in front of the user's eye. The substrate may include a first light deflector configured to direct a first portion of illumination light reflected by the user's eye to the camera to form a first image of the user's eye in a first area of an image frame, where the first image may include one or more glints corresponding to the one or more light sources. The substrate may also include a second light deflector configured to direct a second portion of the illumination light reflected by the user's eye to the camera to form a second image of the user's eye in a second area of the image frame, where the second image may include one or more glints corresponding to the one or more light sources. In some embodiments, each of the first light deflector and the second light deflector may include a reflective Fresnel lens, a Fresnel mirror, a dichroic mirror, a reflective grating, a diffractive optical element, a holographic optical element, or a reflective thin film coating.

In some embodiments, a display device may include a waveguide-based display substrate transparent to visible light and configured to be placed in front of a user's eye. The waveguide-based display substrate may include a first light deflector configured to direct a first portion of invisible light reflected by the user's eye to a camera to form a first image of the user's eye in a first area of an image frame, and a second light deflector configured to direct a second portion of the invisible light reflected by the user's eye to the camera to form a second image of the user's eye in a second area of the image frame. In some embodiments, each of the first light deflector and the second light deflector may include a reflective Fresnel lens, a Fresnel mirror, a dichroic mirror, a reflective grating, a diffractive optical element, a holographic optical element, or a reflective thin film coating.

According to certain embodiments, a method of tracking an eye of a user of a near-eye display system may include illuminating the eye of the user by invisible light emitted from one or more light sources, and receiving, by a substrate of the near-eye display system positioned in front of the eye of the user, invisible light reflected by the eye of the user. The method may also include deflecting, by a first light deflector on the substrate, a first portion of the invisible light reflected by the eye of the user to a camera to form a first image of the eye of the user in a first area of an image frame, where the first image may include one or more glints corresponding to the one or more light sources. The method may further include deflecting, by a second light deflector on the substrate, a second portion of the invisible light reflected by the eye of the user to the camera to form a second image of the eye of the user in a second area of the image frame, where the second image may include one or more glints corresponding to the one or more light sources. In some embodiments, each of the first light deflector and the second light deflector may include a reflective Fresnel lens, a Fresnel mirror, a dichroic mirror, a reflective grating, a diffractive optical element, a holographic optical element, or a reflective thin film coating.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 10A illustrates eye imaging using a first light deflector in an example eye-imaging unit of a near-eye display system according to certain embodiments.

FIG. 10B illustrates eye imaging using a second light deflector in an example eye-imaging unit of a near-eye display system according to certain embodiments.

FIG. 12A is a top view of an example eye-imaging unit in a near-eye display system according to certain embodiments.

FIG. 12B is a side view of an example eye-imaging unit in a near-eye display system according to certain embodiments.

FIG. 14A illustrates two interleaved light deflectors on a same surface of a substrate in an example eye-imaging unit of a near-eye display system according to certain embodiments.

FIG. 14B illustrates two interleaved light deflectors on a same surface of a substrate in an example eye-imaging unit of a near-eye display system according to certain embodiments.

Figure 1:
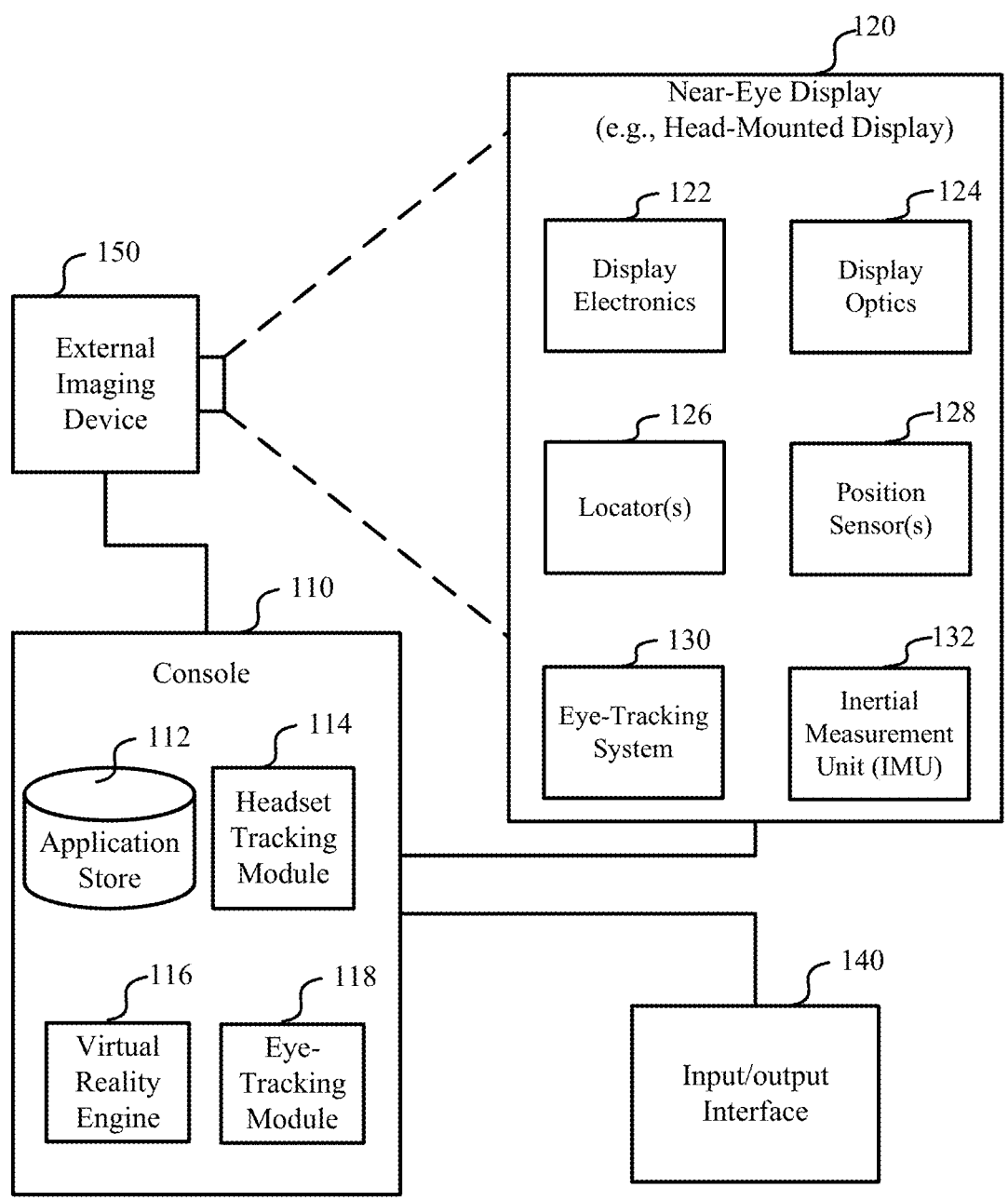
FIG. 1 is a simplified block diagram of an example of an artificial reality system environment including a near-eye display system according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure. In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques disclosed herein relate generally to an artificial reality system, and more specifically, to an eye-tracking subsystem for the artificial reality system.

In an artificial reality system, such as a virtual reality (VR), augmented reality (AR), or mixed reality (MR) system, to improve user interaction with presented content, the artificial reality system may track the user's eye and modify or generate content based on a location or a direction in which the user is looking at. Tracking the eye may include tracking the position and/or shape of the pupil and/or the cornea of the eye, and determining the rotational position or gaze direction of the eye. To track the eye, an eye-tracking system of the near-eye display system may include an illumination subsystem that can illuminate the user's eye using light sources mounted to or inside the artificial reality system. The eye-tracking system may also include an imaging subsystem that includes an imaging device (e.g., a camera) for capturing light reflected by various surfaces of the user's eye. Light that is diffusively reflected (e.g., scattered) by, for example, the iris or pupil of the user's eye may affect the contrast of the captured image in the iris or pupil region, which may be used to determine the edges of the iris or pupil and the center of the pupil. Light that is reflected specularly off the cornea of the user's eye may result in "glints" in the captured image. The glints may also be referred to as the first Purkinje images or corneal reflections. Techniques such as the centroiding algorithm may be used to determine the locations of the glints on the eye in the captured image. For example, the centroiding algorithm may determine the center of the glint by finding the pixel location with the most energy in a local neighborhood. The rotational position (e.g., the gaze direction) of the eye may then be determined based on the locations of the glints relative to a known feature of the eye (e.g., the center of the pupil) within the captured image.

The imaging devices (e.g., one or more eye-tracking cameras) may effectively capture images of illuminated portions of the eye and images (glints) of the light sources (e.g., LEDs). The light sources may be positioned at the periphery of the user's field of view to provide light that may be reflected specularly by the cornea of the eye. The imaging devices may also be placed at the periphery of the user's field of view (e.g., along the circumference of the viewing optics or on a frame of the near-eye display system). Such a configuration may use more than one camera for imaging, and may need to switch cameras (and therefore may cause discontinuity in eye-tracking) when the eye's gazing angle changes (e.g., turning away from a particular camera).

In many applications, the viewing direction (e.g., gazing angle) may need to be determined with a high accuracy, such as less than 5°, less than 1, or better. The eye-tracking system may also need to be robust in order to accommodate for extreme changes in the viewing direction and variations in facial features surrounding user's eyes, such as cases where portions of the eye, including portions of the iris or the pupil, may be obscured by, for example, eyelids or eye lashes. Obscurations may often occur when, for example, the user looks in a downward direction or when the user rapidly re-acquires the viewing direction after the eyelids reopen after eye blinks. Thus, it may be desirable to capture multiple views of the user's eye from different perspectives (e.g., viewing angles). In addition, with two or more views, a single point calibration may be sufficient for determining the gaze direction. While a larger number of cameras in the periphery of the user's field of view may provide multiple views of the eye and help to increase the accuracy and robustness of the eye tracking, increasing the number of cameras would cause a higher cost and weight of the tracking system and a larger amount of power consumption, which may not be suitable for devices designed for extended use.

According to certain embodiments of the eye-tracking system disclosed herein, an imaging system for eye tracking may include one or more light sources configured to illuminate a user's eye, a camera for capturing images of the user's eye, and a substrate including two or more light deflectors that are configured to direct light reflected by the user's eye to the camera at different angles to form two or more images of the user's eye viewed from difference perspectives in a same image frame. The light deflectors may include any combination of, for example, a reflective Fresnel lens, a Fresnel mirror, a reflective grating, a partial reflective coating, a geometric lens, a dichroic mirror (e.g., a hot mirror), a diffractive optical element (DOE), or a holographic optical element (HOE). The two or more light deflectors may be in different areas on a same surface of a substrate, on different surfaces of the substrate, or on different layers of the substrate.

As used herein, visible light may refer to light with a wavelength between about 380 nm to about 750 nm. Invisible light may refer to light with a wavelength outside of the range between about 380 nm to about 750 nm, such as infrared (IR) or near infrared (NIR) light. Near infrared light may refer to light with a wavelength between about 750 nm to about 2500 nm. The desired infrared wavelength range may include the wavelength range of IR light that can be detected by a suitable IR sensor (e.g., a complementary metal-oxide semiconductor (CMOS) or a charge-coupled device (CCD) sensor), such as between 830 nm and 860 nm or between 930 nm and 980 nm.

As also used herein, a substrate may refer to a medium within which light may propagate. The substrate may include one or more types of dielectric materials, such as glass, quartz, plastic, polymer, poly(methyl methacrylate) (PMMA), crystal, or ceramic. At least one type of material of the substrate may be transparent to visible light and NIR light. A thickness of the substrate may range from, for example, less than about 1 mm to about 10 mm or more. As used herein, a material may be "transparent" to a light beam if the light beam can pass through the material with a high transmission rate, such as larger than 60%, 75%, 80%, 90%, 95%, 98%, 99%, or higher, where a small portion of the light beam (e.g., less than 40%, 25%, 20%, 10%, 5%, 2%, 1%, or less) may be scattered, reflected, or absorbed by the material. The transmission rate (i.e., transmissivity) may be represented by either a photopically weighted or an unweighted average transmission rate over a range of wavelengths, or the lowest transmission rate over a range of wavelengths, such as the visible wavelength range.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display system 120 in accordance with certain embodiments. Artificial reality system environment 100 shown in FIG. 1 may include near-eye display system 120, an optional external imaging device 150, and an optional input/output interface 140 that may each be coupled to an optional console 110. While FIG. 1 shows example artificial reality system environment 100 including one near-eye display system 120, one external imaging device 150, and one input/output interface 140, any number of these components may be included in artificial reality system environment 100, or any of the components may be omitted. For example, there may be multiple near-eye display systems 120 monitored by one or more external imaging devices 150 in communication with console 110. In some configurations, artificial reality system environment 100 may not include external imaging device 150, optional input/output interface 140, and optional console 110. In alternative configurations, different or additional components may be included in artificial reality system environment 100.

Near-eye display system 120 may be a head-mounted display that presents content to a user. Examples of content presented by near-eye display system 120 include one or more of images, videos, audios, or some combination thereof. In some embodiments, audios may be presented via an external device (e.g., speakers and/or headphones) that receives audio information from near-eye display system 120, console 110, or both, and presents audio data based on the audio information. Near-eye display system 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display system 120 may be implemented in any suitable form factor, including a pair of glasses. Some embodiments of near-eye display system 120 are further described below. Additionally, in various embodiments, the functionality described herein may be used in a headset that combines images of an environment external to near-eye display system 120 and artificial reality content (e.g., computer-generated images). Therefore, near-eye display system 120 may augment images of a physical, real-world environment external to near-eye display system 120 with generated content (e.g., images, video, sound, etc.) to present an augmented reality to a user.

In various embodiments, near-eye display system 120 may include one or more of display electronics 122, display optics 124, and an eye-tracking system 130. In some embodiments, near-eye display system 120 may also include one or more locators 126, one or more position sensors 128, and an inertial measurement unit (IMU) 132. Near-eye display system 120 may omit any of these elements or include additional elements in various embodiments. Additionally, in some embodiments, near-eye display system 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (mLED) display, an active-matrix OLED display (AMO-LED), a transparent OLED display (TOLED), or some other display. For example, in one implementation of near-eye display system 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereo effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers), magnify image light received from display electronics 122, correct optical errors associated with the image light, and present the corrected image light to a user of near-eye display system 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display system 120/

Display optics 124 may also be designed to correct one or more types of optical errors, such as two-dimensional optical errors, three-dimensional optical errors, or a combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display system 120 relative to one another and relative to a reference point on near-eye display system 120. In some implementations, console 110 may identify locators 126 in images captured by external imaging device 150 to determine the artificial reality headset's position, orientation, or both. A locator 126 may be a light emitting diode (LED), a corner cube reflector, a reflective marker, a type of light source that contrasts with an environment in which near-eye display system 120 operates, or some combinations thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

External imaging device 150 may generate slow calibration data based on calibration parameters received from console 110. Slow calibration data may include one or more images showing observed positions of locators 126 that are detectable by external imaging device 150. External imaging device 150 may include one or more cameras, one or more video cameras, any other device capable of capturing images including one or more of locators 126, or some combinations thereof. Additionally, external imaging device 150 may include one or more filters (e.g., to increase signal to noise ratio). External imaging device 150 may be configured to detect light emitted or reflected from locators 126 in a field of view of external imaging device 150. In embodiments where locators 126 include passive elements (e.g., retroreflectors), external imaging device 150 may include a light source that illuminates some or all of locators 126, which may retro-reflect the light to the light source in external imaging device 150. Slow calibration data may be communicated from external imaging device 150 to console 110, and external imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display system 120. Examples of position sensors 128 may include accelerometers, gyroscopes, magnetometers, other motion-detecting or error-correcting sensors, or some combinations thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or some combination thereof. Based on the one or more measurement signals from one or more position sensors 128, IMU 132 may generate fast calibration data indicating an estimated position of near-eye display system 120 relative to an initial position of near-eye display system 120. For example, IMU 132 may integrate measurement signals received from accelerometers over time to estimate a velocity vector and integrate the velocity vector over time to determine an estimated position of a reference point on near-eye display system 120. Alternatively, IMU 132 may provide the sampled measurement signals to console 110, which may determine the fast calibration data. While the reference point may generally be defined as a point in space, in various embodiments, the reference point may also be defined as a point within near-eye display system 120 (e.g., a center of IMU 132).

Eye-tracking system 130 may include one or more eye-tracking systems. Eye tracking may refer to determining an eye's position, including orientation and location of the eye, relative to near-eye display system 120. An eye-tracking system may include an imaging system to image one or more eyes and may generally include a light emitter, which may generate light that is directed to an eye such that light reflected by the eye may be captured by the imaging system. For example, eye-tracking system 130 may include a non-coherent or coherent light source (e.g., a laser diode) emitting light in the visible spectrum or infrared spectrum, and a camera capturing the light reflected by the user's eye. As another example, eye-tracking system 130 may capture reflected radio waves emitted by a miniature radar unit. Eye-tracking system 130 may use low-power light emitters that emit light at frequencies and intensities that would not injure the eye or cause physical discomfort. Eye-tracking system 130 may be arranged to increase contrast in images of an eye captured by eye-tracking system 130 while reducing the overall power consumed by eye-tracking system 130 (e.g., reducing power consumed by a light emitter and an imaging system included in eye-tracking system 130). For example, in some implementations, eye-tracking system 130 may consume less than 100 milliwatts of power.

In some embodiments, eye-tracking system 130 may include one light emitter and one camera to track each of the user's eyes. Eye-tracking system 130 may also include different eye-tracking systems that operate together to provide improved eye tracking accuracy and responsiveness. For example, eye-tracking system 130 may include a fast eye-tracking system with a fast response time and a slow eye-tracking system with a slower response time. The fast eye-tracking system may frequently measure an eye to capture data used by an eye-tracking module 118 to determine the eye's position relative to a reference eye position. The slow eye-tracking system may independently measure the eye to capture data used by eye-tracking module 118 to determine the reference eye position without reference to a previously determined eye position. Data captured by the slow eye-tracking system may allow eye-tracking module 118 to determine the reference eye position with greater accuracy than the eye's position determined from data captured by the fast eye-tracking system. In various embodiments, the slow eye-tracking system may provide eye-tracking data to eye-tracking module 118 at a lower frequency than the fast eye-tracking system. For example, the slow eye-tracking system may operate less frequently or have a slower response time to conserve power.

Eye-tracking system 130 may be configured to estimate the orientation of the user's eye. The orientation of the eye may correspond to the direction of the user's gaze within near-eye display system 120. The orientation of the user's eye may be defined as the direction of the foveal axis, which is the axis between the fovea (an area on the retina of the eye with the highest concentration of photoreceptors) and the center of the eye's pupil. In general, when a user's eyes are fixed on a point, the foveal axes of the user's eyes intersect that point. The pupillary axis of an eye may be defined as the axis that passes through the center of the pupil and is perpendicular to the corneal surface. In general, even though the pupillary axis and the foveal axis intersect at the center of the pupil, the pupillary axis may not directly align with the foveal axis. For example, the orientation of the foveal axis may be offset from the pupillary axis by approximately −1° to 8° laterally and about ±4° vertically (which may be referred to as kappa angles, which may vary from person to person). Because the foveal axis is defined according to the fovea, which is located in the back of the eye, the foveal axis may be difficult or impossible to measure directly in some eye-tracking embodiments. Accordingly, in some embodiments, the orientation of the pupillary axis may be detected and the foveal axis may be estimated based on the detected pupillary axis.

In general, the movement of an eye corresponds not only to an angular rotation of the eye, but also to a translation of the eye, a change in the torsion of the eye, and/or a change in the shape of the eye. Eye-tracking system 130 may also be configured to detect the translation of the eye, which may be a change in the position of the eye relative to the eye socket. In some embodiments, the translation of the eye may not be detected directly, but may be approximated based on a mapping from a detected angular orientation. Translation of the eye corresponding to a change in the eye's position relative to the eye-tracking system due to, for example, a shift in the position of near-eye display system 120 on a user's head, may also be detected. Eye-tracking system 130 may also detect the torsion of the eye and the rotation of the eye about the pupillary axis. Eye-tracking system 130 may use the detected torsion of the eye to estimate the orientation of the foveal axis from the pupillary axis. In some embodiments, eye-tracking system 130 may also track a change in the shape of the eye, which may be approximated as a skew or scaling linear transform or a twisting distortion (e.g., due to torsional deformation). In some embodiments, eye-tracking system 130 may estimate the foveal axis based on some combinations of the angular orientation of the pupillary axis, the translation of the eye, the torsion of the eye, and the current shape of the eye.

In some embodiments, eye-tracking system 130 may include multiple emitters or at least one emitter that can project a structured light pattern on all portions or a portion of the eye. The structured light pattern may be distorted due to the shape of the eye when viewed from an offset angle. Eye-tracking system 130 may also include at least one camera that may detect the distortions (if any) of the structured light pattern projected onto the eye. The camera may be oriented on a different axis to the eye than the emitter. By detecting the deformation of the structured light pattern on the surface of the eye, eye-tracking system 130 may determine the shape of the portion of the eye being illuminated by the structured light pattern. Therefore, the captured distorted light pattern may be indicative of the 3D shape of the illuminated portion of the eye. The orientation of the eye may thus be derived from the 3D shape of the illuminated portion of the eye. Eye-tracking system 130 can also estimate the pupillary axis, the translation of the eye, the torsion of the eye, and the current shape of the eye based on the image of the distorted structured light pattern captured by the camera.

Near-eye display system 120 may use the orientation of the eye to, e.g., determine an inter-pupillary distance (IPD) of the user, determine gaze directions, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or some combination thereof. Because the orientation may be determined for both eyes of the user, eye-tracking system 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140.

Console 110 may provide content to near-eye display system 120 for presentation to the user in accordance with information received from one or more of external imaging device 150, near-eye display system 120, and input/output interface 140. In the example shown in FIG. 1, console 110 may include an application store 112, a headset tracking module 114, an artificial reality engine 116, and eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display system 120 using slow calibration information from external imaging device 150. For example, headset tracking module 114 may determine positions of a reference point of near-eye display system 120 using observed locators from the slow calibration information and a model of near-eye display system 120. Headset tracking module 114 may also determine positions of a reference point of near-eye display system 120 using position information from the fast calibration information. Additionally, in some embodiments, headset tracking module 114 may use portions of the fast calibration information, the slow calibration information, or some combination thereof, to predict a future location of near-eye display system 120. Headset tracking module 114 may provide the estimated or predicted future position of near-eye display system 120 to artificial reality engine 116.

Headset tracking module 114 may calibrate the artificial reality system environment 100 using one or more calibration parameters, and may adjust one or more calibration parameters to reduce errors in determining the position of near-eye display system 120. For example, headset tracking module 114 may adjust the focus of external imaging device 150 to obtain a more accurate position for observed locators on near-eye display system 120. Moreover, calibration performed by headset tracking module 114 may also account for information received from IMU 132. Additionally, if tracking of near-eye display system 120 is lost (e.g., external imaging device 150 loses line of sight of at least a threshold number of locators 126), headset tracking module 114 may re-calibrate some or all of the calibration parameters.

Artificial reality engine 116 may execute applications within artificial reality system environment 100 and receive position information of near-eye display system 120, acceleration information of near-eye display system 120, velocity information of near-eye display system 120, predicted future positions of near-eye display system 120, or some combination thereof from headset tracking module 114. Artificial reality engine 116 may also receive estimated eye position and orientation information from eye-tracking module 118. Based on the received information, artificial reality engine 116 may determine content to provide to near-eye display system 120 for presentation to the user. For example, if the received information indicates that the user has looked to the left, artificial reality engine 116 may generate content for near-eye display system 120 that reflects the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display system 120 or haptic feedback via input/output interface 140.

Eye-tracking module 118 may receive eye-tracking data from eye-tracking system 130 and determine the position of the user's eye based on the eye-tracking data. The position of the eye may include an eye's orientation, location, or both relative to near-eye display system 120 or any element thereof. Because the eye's axes of rotation change as a function of the eye's location in its socket, determining the eye's location in its socket may allow eye-tracking module 118 to more accurately determine the eye's orientation.

In some embodiments, eye-tracking module 118 may store a mapping between images captured by eye-tracking system 130 and eye positions to determine a reference eye position from an image captured by eye-tracking system 130. Alternatively or additionally, eye-tracking module 118 may determine an updated eye position relative to a reference eye position by comparing an image from which the reference eye position is determined to an image from which the updated eye position is to be determined. Eye-tracking module 118 may determine eye position using measurements from different imaging devices or other sensors. For example, eye-tracking module 118 may use measurements from a slow eye-tracking system to determine a reference eye position, and then determine updated positions relative to the reference eye position from a fast eye-tracking system until a next reference eye position is determined based on measurements from the slow eye-tracking system.

Eye-tracking module 118 may also determine eye calibration parameters to improve precision and accuracy of eye tracking. Eye calibration parameters may include parameters that may change whenever a user dons or adjusts near-eye display system 120. Example eye calibration parameters may include an estimated distance between a component of eye-tracking system 130 and one or more parts of the eye, such as the eye's center, pupil, cornea boundary, or a point on the surface of the eye. Other example eye calibration parameters may be specific to a particular user and may include an estimated average eye radius, an average corneal radius, an average sclera radius, a map of features on the eye surface, and an estimated eye surface contour. In embodiments where light from the outside of near-eye display system 120 may reach the eye (as in some augmented reality applications), the calibration parameters may include correction factors for intensity and color balance due to variations in light from the outside of near-eye display system 120. Eye-tracking module 118 may use eye calibration parameters to determine whether the measurements captured by eye-tracking system 130 would allow eye-tracking module 118 to determine an accurate eye position (also referred to herein as "valid measurements"). Invalid measurements, from which eye-tracking module 118 may not be able to determine an accurate eye position, may be caused by the user blinking, adjusting the headset, or removing the headset, and/or may be caused by near-eye display system 120 experiencing greater than a threshold change in illumination due to external light. In some embodiments, at least some of the functions of eye-tracking module 118 may be performed by eye-tracking system 130.

Figure 2:
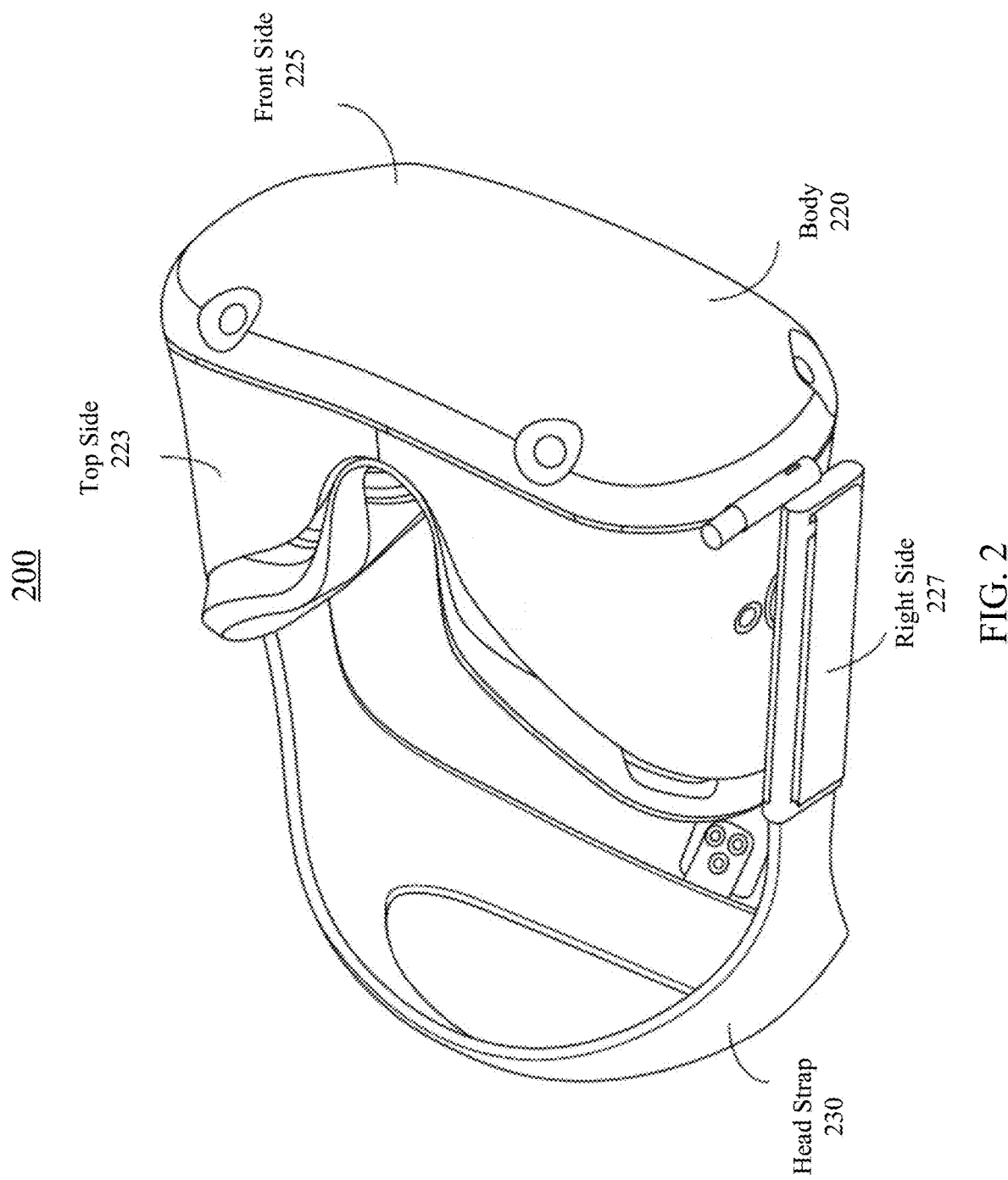
FIG. 2 is a perspective view of an example of a near-eye display system in the form of a head-mounted display (HMID) device for implementing some of the examples disclosed herein.

FIG. 2 is a perspective view of an example of a near-eye display system in the form of a head-mounted display (HMD) device 200 for implementing some of the examples disclosed herein. HMD device 200 may be a part of, e.g., a virtual reality (VR) system, an augmented reality (AR) system, a mixed reality (MR) system, or some combinations thereof. HMD device 200 may include a body 220 and a head strap 230. FIG. 2 shows a top side 223, a front side 225, and a right side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temples tips as shown in, for example, FIG. 2, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audios, or some combinations thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, a liquid crystal display (LCD), an organic light emitting diode (OLED) display, an inorganic light emitting diode (ILED) display, a micro light emitting diode (mLED) display, an active-matrix organic light emitting diode (AMOLED) display, a transparent organic light emitting diode (TOLED) display, some other display, or some combinations thereof. HMD device 200 may include two eye box regions.

In some implementations, HMD device 200 may include various sensors (not shown), such as depth sensors, motion sensors, position sensors, and eye-tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or some combination thereof of HMD device 200 from the various sensors. In some implementations, the information received by the virtual reality engine may be used for producing a signal (e.g., display instructions) to the one or more display assemblies. In some implementations, HMD device 200 may include locators (not shown, such as locators 126) located in fixed positions on body 220 relative to one another and relative to a reference point. Each of the locators may emit light that is detectable by an external imaging device.

Figure 3:
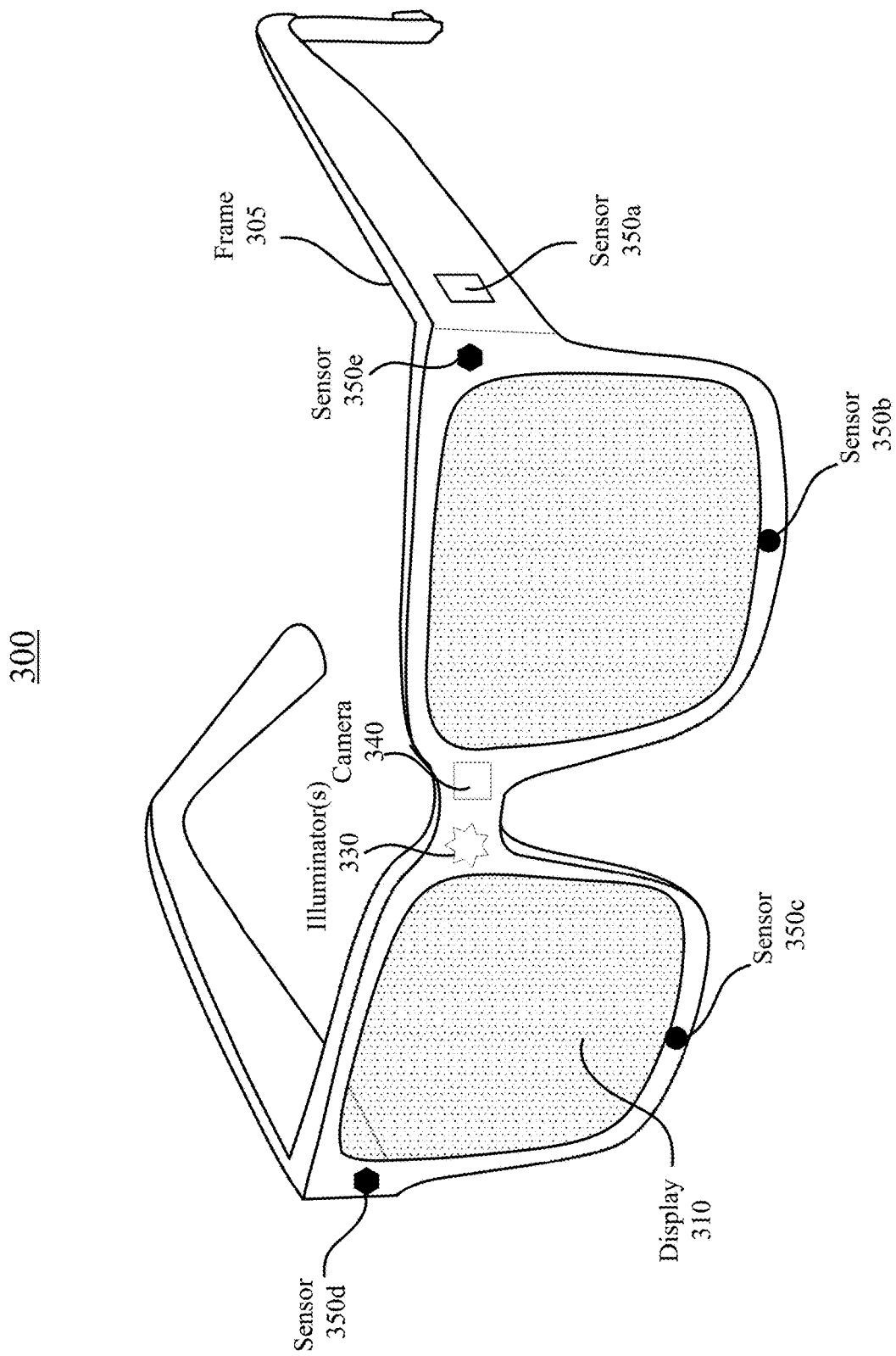
FIG. 3 is a perspective view of a simplified example of a near-eye display system in the form of a pair of glasses for implementing some of the examples disclosed herein.

FIG. 3 is a perspective view of a simplified example near-eye display system 300 in the form of a pair of glasses for implementing some of the examples disclosed herein.

Near-eye display system 300 may be a specific implementation of near-eye display system 120 of FIG. 1, and may be configured to operate as a virtual reality display, an augmented reality display, and/or a mixed reality display. Near-eye display system 300 may include a frame 305 and a display 310. Display 310 may be configured to present content to a user. In some embodiments, display 310 may include display electronics and/or display optics. For example, as described above with respect to near-eye display system 120 of FIG. 1, display 310 may include an LCD display panel, an LED display panel, or an optical display panel (e.g., a waveguide display assembly).

Near-eye display system 300 may further include various sensors 350a, 350b, 350c, 350d, and 350e on or within frame 305. In some embodiments, sensors 350a-350e may include one or more depth sensors, motion sensors, position sensors, inertial sensors, or ambient light sensors. In some embodiments, sensors 350a-350e may include one or more image sensors configured to generate image data representing different fields of views in different directions. In some embodiments, sensors 350a-350e may be used as input devices to control or influence the displayed content of near-eye display system 300, and/or to provide an interactive VR/AR/MR experience to a user of near-eye display system 300. In some embodiments, sensors 350a-350e may also be used for stereoscopic imaging.

In some embodiments, near-eye display system 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350a-350e in capturing images of different objects within the dark environment. In some embodiments, illuminator(s) 330 may be used to project certain light pattern onto the objects within the environment. In some embodiments, illuminator(s) 330 may be used as locators, such as locators 126 described above with respect to FIG. 1.

In some embodiments, near-eye display system 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
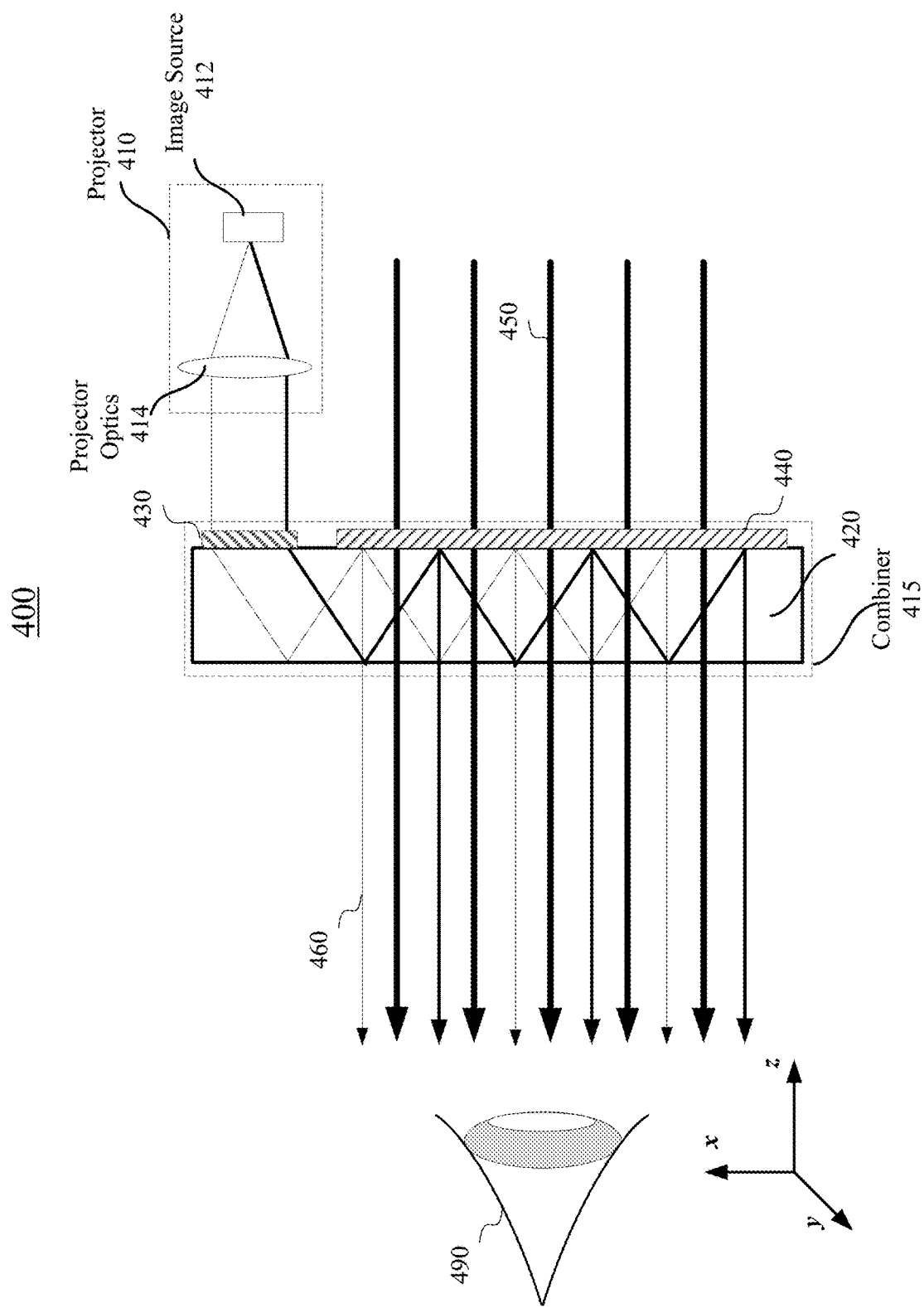
FIG. 4 illustrates an example of an optical see-through augmented reality system using a waveguide display according to certain embodiments.

FIG. 4 illustrates an example of an optical see-through augmented reality system 400 using a waveguide display according to certain embodiments. Augmented reality system 400 may include a projector 410 and a combiner 415. Projector 410 may include a light source or image source 412 and projector optics 414. In some embodiments, image source 412 may include a plurality of pixels that displays virtual objects, such as an LCD display panel or an LED display panel. In some embodiments, image source 412 may include a light source that generates coherent or partially coherent light. For example, image source 412 may include a laser diode, a vertical cavity surface emitting laser, and/or a light emitting diode. In some embodiments, image source 412 may include a plurality of light sources each emitting a monochromatic image light corresponding to a primary color (e.g., red, green, or blue). In some embodiments, image source 412 may include an optical pattern generator, such as a spatial light modulator. Projector optics 414 may include one or more optical components that can condition the light from image source 412, such as expanding, collimating, scanning, or projecting light from image source 412 to combiner 415. The one or more optical components may include, for example, one or more lenses, liquid lenses, mirrors, apertures, and/or gratings. In some embodiments, projector optics 414 may include a liquid lens (e.g., a liquid crystal lens) with a plurality of electrodes that allows scanning of the light from image source 412.

Combiner 415 may include an input coupler 430 for coupling light from projector 410 into a substrate 420 of combiner 415. Combiner 415 may transmit at least 50% of light in a first wavelength range and reflect at least 25% of light in a second wavelength range. For example, the first wavelength range may be visible light from about 400 nm to about 650 nm, and the second wavelength range may be in the infrared band, for example, from about 800 nm to about 1000 nm. Input coupler 430 may include a volume holographic grating, a diffractive optical elements (DOE) (e.g., a surface-relief grating), a slanted surface of substrate 420, or a refractive coupler (e.g., a wedge or a prism). Input coupler 430 may have a coupling efficiency of greater than 30%, 50%, 75%, 90%, or higher for visible light. Light coupled into substrate 420 may propagate within substrate 420 through, for example, total internal reflection (TIR). Substrate 420 may be in the form of a lens of a pair of eyeglasses. Substrate 420 may have a flat or a curved surface, and may include one or more types of dielectric materials, such as glass, quartz, plastic, polymer, poly(methyl methacrylate) (PMMA), crystal, or ceramic. A thickness of the substrate may range from, for example, less than about 1 mm to about 10 mm or more. Substrate 420 may be transparent to visible light.

Substrate 420 may include or may be coupled to a plurality of output couplers 440 configured to extract at least a portion of the light guided by and propagating within substrate 420 from substrate 420, and direct extracted light 460 to an eye 490 of the user of augmented reality system 400. As input coupler 430, output couplers 440 may include grating couplers (e.g., volume holographic gratings or surface-relief gratings), other DOEs, prisms, etc. Output couplers 440 may have different coupling (e.g., diffraction) efficiencies at different locations. Substrate 420 may also allow light 450 from environment in front of combiner 415 to pass through with little or no loss. Output couplers 440 may also allow light 450 to pass through with little loss. For example, in some implementations, output couplers 440 may have a low diffraction efficiency for light 450 such that light 450 may be refracted or otherwise pass through output couplers 440 with little loss, and thus may have a higher intensity than extracted light 460. In some implementations, output couplers 440 may have a high diffraction efficiency for light 450 and may diffract light 450 to certain desired directions (i.e., diffraction angles) with little loss. As a result, the user may be able to view combined images of the environment in front of combiner 415 and virtual objects projected by projector 410.

Figure 5:
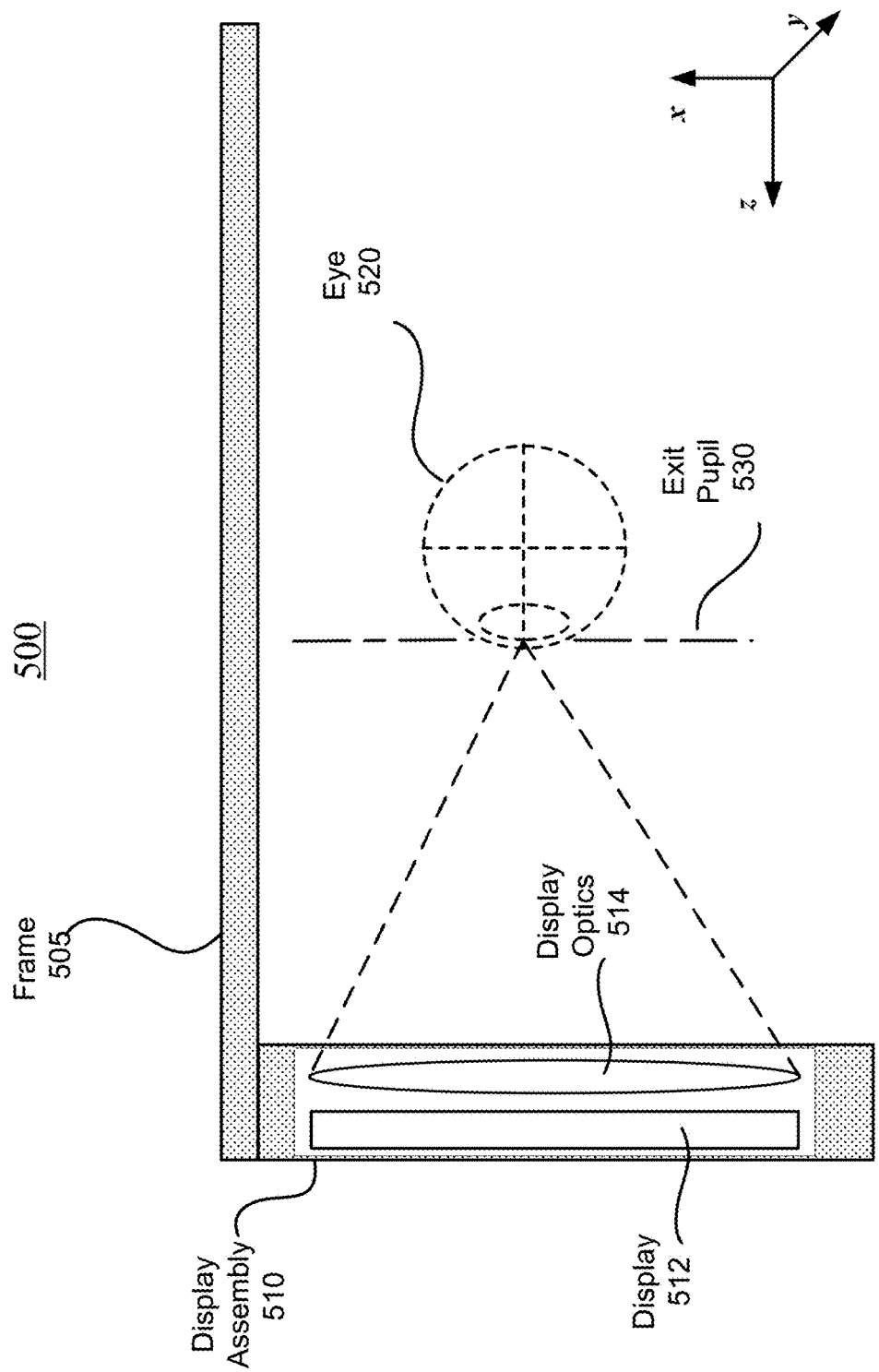
FIG. 5 is a cross-sectional view of an example of a near-eye display system according to certain embodiments.

FIG. 5 is a cross-sectional view of an example of a near-eye display system 500 according to certain embodiments. Near-eye display system 500 may include at least one display assembly 510. Display assembly 510 may be configured to direct image light (i.e., display light) to an eyebox located at exit pupil 530 of near-eye display system 500 and to user's eye 520. It is noted that, even though FIG. 5 and other figures in the present disclosure show an eye of a user of a near-eye display system for illustration purposes, the eye of the user is not a part of the corresponding near-eye display system.

As HMD device 200 and near-eye display system 300, near-eye display system 500 may include a frame 505 and a display assembly 510 that includes a display 512 and/or display optics 514 coupled to or embedded in frame 505. As described above, display 512 may display images to the user electrically (e.g., using LCD) or optically (e.g., using an waveguide display and optical couplers as described with respect to FIG. 4) according to data received from a console, such as console 110. Display 512 may include sub-pixels to emit light of a predominant color, such as red, green, blue, white, or yellow. In some embodiments, display assembly 510 may include a stack of one or more waveguide displays including, but not restricted to, a stacked waveguide display, a varifocal waveguide display, etc. The stacked waveguide display may include a polychromatic display (e.g., a red-green-blue (RGB) display) created by stacking waveguide displays whose respective monochromatic sources are of different colors. The stacked waveguide display may also be a polychromatic display that can be projected on multiple planes (e.g. multi-planar colored display). In some configurations, the stacked waveguide display may be a monochromatic display that can be projected on multiple planes (e.g. multi-planar monochromatic display). The varifocal waveguide display is a display that can adjust a focal position of image light emitted from the waveguide display. In alternate embodiments, display assembly 510 may include the stacked waveguide display and the varifocal waveguide display.

Display optics 514 may be similar to display optics 124 and may display image content optically (e.g., using optical waveguides and optical couplers), or may correct optical errors associated with the image light, combine images of virtual objects and real objects, and present the corrected image light to exit pupil 530 of near-eye display system 500, where the user's eye 520 may be located at. Display optics 514 may also relay the image generated by display 512 to create virtual images that appear to be away from the image source and further than just a few centimeters away from the eyes of the user. For example, display optics 514 may collimate light from the image source or project the displayed image to create a virtual image that may appear to be far away and convert spatial information of the displayed virtual objects into angular information. Display optics 514 may also magnify the image source to make the image appear larger than the actual size of the image source.

There may be several types of eye measurements for determining user intent, cognitive processes, behavior, attention, etc. These measurements may include, for example, measurement related to fixations, where the eyes are stationary between movements and visual input may occur. Fixation-related measurement variables may include, for example, total fixation duration, mean fixation duration, fixation spatial density, number of areas fixated, fixation sequences, and fixation rate. The eye measurements may also include measurements of saccades, which are rapid eye movements that occur between fixations. Saccade related parameters may include, for example, saccade number, amplitude, velocity, acceleration, and fixation-saccade ratio. The eye measurements may also include measurements of scanpath, which may include a series of short fixations and saccades alternating before the eyes reach a target location on the display screen. Movement measures derived from scanpath may include, for example, scanpath direction, duration, length, and area covered. The eye movement measurements may further include measuring the sum of all fixations made in an area of interest before the eyes leave that area or the proportion of time spent in each area. The eye measurements may also include measuring pupil size and blink rate, which may be used to study cognitive workload.

In addition, as described above, in an artificial reality system, to improve user interaction with presented content, the artificial reality system may track the user's eye and modify or generate content based on a location or a direction in which the user is looking at. Tracking the eye may include tracking the position and/or shape of the pupil and/or the cornea of the eye, and determining the rotational position or gaze direction of the eye. One technique (referred to as Pupil Center Corneal Reflection or PCCR method) involves using NIR LEDs to produce glints on the eye cornea surface and then capturing images/videos of the eye region. Gaze direction can be estimated from the relative movement between the pupil center and glints.

Figure 6:
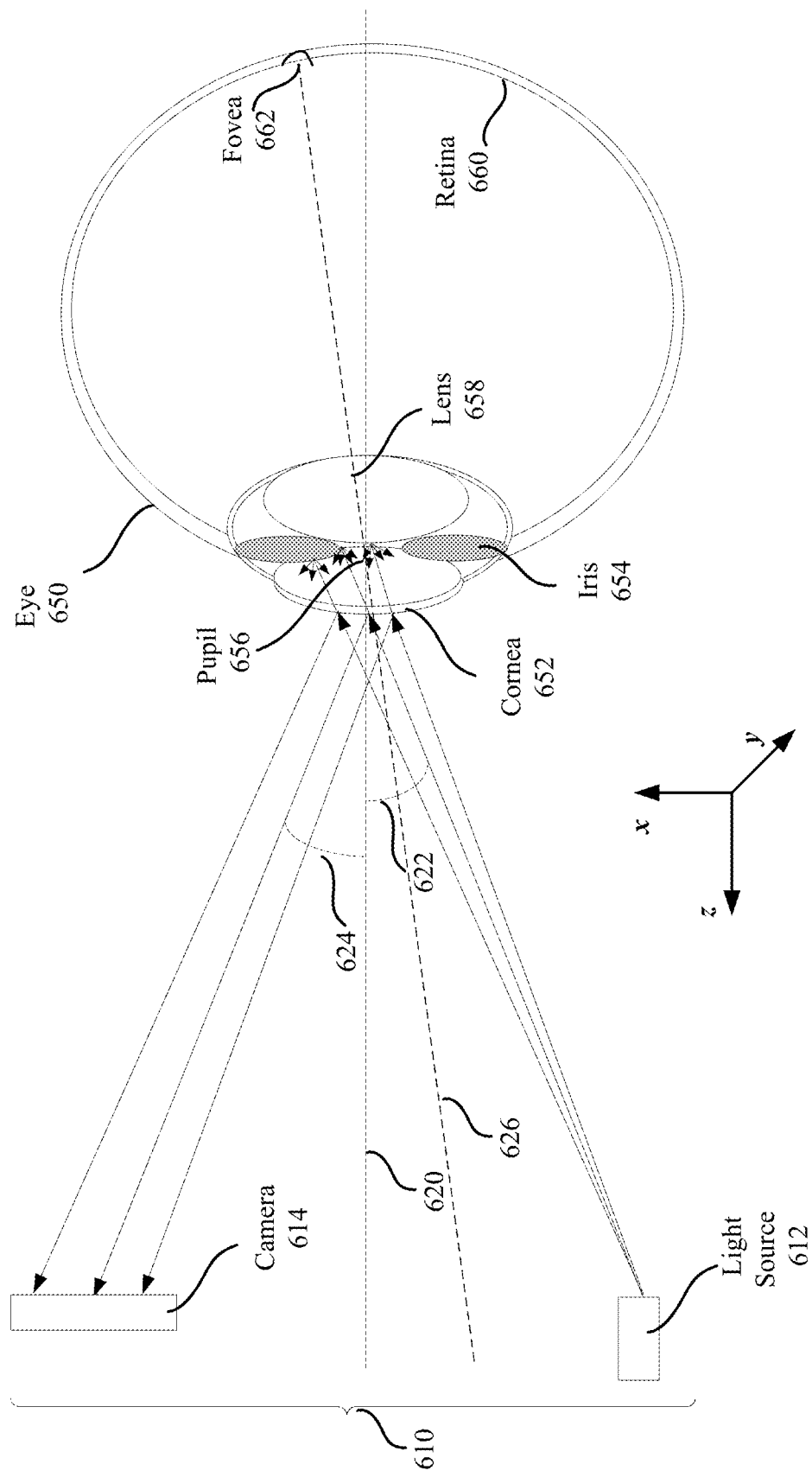
FIG. 6 illustrates light reflections and scattering by an eye during eye tracking.

FIG. 6 illustrates light reflections and scattering by an eye 650 during eye tracking using an eye-tracking system 610, such as eye-tracking system 130. Eye-tracking system 610 may include a light source 612 and a camera 614 as described above. In other embodiments, eye-tracking system 610 may include different and/or additional components than those depicted in FIG. 6. Light source 612 may include, for example, a laser, an LED, or VCSELs, and may be mounted at a laser angle 622 relative to a surface normal vector 620 of eye 650. Surface normal vector 620 is orthogonal to a portion of the surface (e.g., cornea 652) of eye 650 illuminated by light source 612. In the example shown in FIG. 6, surface normal vector 620 may be the same as the pupillary axis (also referred to as optical axis, which may be a line passing through the center of pupil 656 and the center of cornea 652) of eye 650. Laser angle 622 may be measured between surface normal vector 620 and a line from a center of the portion of the surface of eye 650 illuminated by light source 612 to a center of the output aperture of light source 612. Camera 614 may be mounted at a camera angle 624 relative to surface normal vector 620 of eye 650. Camera angle 624 may be measured between surface normal vector 620 and a line from a center of the portion of the surface of eye 650 illuminated by light source 612 to a center of the image sensor or light input aperture of camera 614. In some embodiments, a difference between laser angle 622 and camera angle 624 is less than a threshold amount so that camera 614 may capture images via specular reflections of light incident on cornea 652 of eye 650, which may beneficially increase contrast of the resulting image and minimize light power loss and power consumption.

The light emitted by light source 612 may substantially uniformly illuminate a portion of the eye surface (e.g., cornea 652). A portion of the emitted light may be reflected specularly by cornea 652 of eye 650 and captured by camera 614. In some cases, the light incident on eye 650 may propagate into the eye for a small distance before being reflected. For example, at least some portions of the light may enter eye 650 through cornea 652 and reach iris 654, pupil 656, lens 658, or retina 660 of eye 650. Because some interfaces within eye 650 (e.g., surface of iris 654) may be rough (e.g., due to features such as capillaries or bumps), the interfaces within eye 650 may scatter the incident light in multiple directions. Different portions of the eye surface and the interfaces within eye 650 may have different patterns of features. Thus, an intensity pattern of the light reflected by eye 650 may depend on the pattern of features within the illuminated portion of eye 650, which may allow identification of the portions of the eye (e.g., iris 654 or pupil 656) from the intensity pattern.

Camera 614 may collect and project light reflected by the illuminated portion of eye 650 onto an image sensor of camera 614. Camera 614 may also correct one or more optical errors (such as those described with respect to the display optics 124) to improve the contrast and other properties of the images captured by the image sensor of camera 614. In some embodiments, camera 614 may also magnify the reflected light. In some embodiments, camera 614 may enlarge the images. The image sensor of camera 614 may capture incident light focused by a lens assembly of camera 614. Thus, camera 614 may effectively capture an image of light source 612 (the emitted light of which is reflected specularly by the cornea of the eye) reflected by the eye, resulting in a "glint" in the captured image. Because of the scattering (diffusive reflections) at some interfaces of the eye, light incident on a point of the image sensor may include light reflected from multiple points within the illuminated portion of eye 650, and thus may be the result of the interference of the light reflected from the multiple points. Thus, in some embodiments, the image sensor of camera 614 may also capture a diffraction or speckle pattern formed by a combination of light reflected from multiple points of the surface of eye 650.

Each pixel of the image sensor may include a light-sensitive circuit that can output a current or voltage signal corresponding to the intensity of the light incident on the pixel. In some embodiments, the pixels of the image sensor may be sensitive to light in a narrow wavelength band. In some other embodiments, the pixels of the image sensor may have a wide-band or multi-band sensitivity. For example, the image sensor of camera 614 may include a complementary metal-oxide semiconductor (CMOS) pixel array, which may be used with light having a wavelength less than about 850 nm. As another example, the image sensor of camera 614 may include an indium gallium arsenide (InGaAs) alloy pixel array or a charge-coupled device (CCD). Such an image sensor may be used with a laser emitting light having a wavelength between about 900 nm and about 1160 nm.

In some embodiments, to determine a position change of eye 650, an eye-tracking module (e.g., eye-tracking system 130 or eye-tracking module 118 of FIG. 1) may determine a pixel shift between images. Multiplying the pixel shift by a calibrated distance per pixel may allow the eye-tracking module to determine a distance the surface (e.g., cornea 652) of eye 650 has shifted. For example, if the glint captured in one image is shifted by two pixels relative to the glint captured in a previous image, and each pixel corresponds to a distance of 10 micrometers at the surface of eye 650, the surface of eye 650 may have moved about 20 micrometers.

In some embodiments, eye-tracking techniques used in head-mounted devices may be video-based and may be performed based on appearance or features. For example, the appearance-based techniques may use certain mapping functions to map the entire eye image or a region of interest of the eye image to a gaze direction or point-of-gaze. The mapping function may have a high-dimensional input (e.g., the intensities of image pixels) and a low-dimensional output (e.g., the gaze direction, point-of-gaze, etc.). These mapping functions may be based on machine learning models, such as convolutional neural networks (CNNs).

The feature-based techniques may perform feature extraction and gaze estimation using the extracted features. The features can be any one or more of the following: pupil center, iris center, pupil-iris boundary, iris-sclera boundary, first Purkinje images (reflections off the front surface of the cornea, known as corneal reflections or glints), fourth Purkinje images (reflections of the back surface of the crystalline lens), eye corners, and the like. These features may be extracted using computer vision techniques (e.g., intensity histogram analysis, thresholding, edge detection, blob segmentation, convex-hull, morphological operations, shape fitting, deformable templates, centroiding, etc.) or machine-learning techniques, or any combination. The gaze estimation techniques can be interpolation-based or model-based. The interpolation-based techniques may use certain mapping functions (e.g., second degree bivariate polynomial) to map eye features (e.g., pupil center or pupil center-corneal reflection (PCCR) vector) to the gaze direction. The coefficients of these mapping functions may be obtained through a personal calibration procedure that may involve collecting data while the user fixates at a sequence of fixation targets with known coordinates. This calibration may be performed for each subject and each session, and may sometimes be performed multiple times in each session, because the calibration may be sensitive to slippage of the head-mounted device relative to the head. The mapping functions may then use the calibration data points and interpolation techniques to determine the gaze direction. The model-based methods may use models of the system (e.g., camera(s) and/or light source(s)) and the eye that may include actual physical system parameters and anatomical eye parameters to determine a 3-D gaze from a set of eye features (e.g., pupil boundary and multiple corneal reflections) according to 3-D geometry. Model-based techniques may perform both a one-time system calibration and a one-time personal calibration for each user. The data collection procedure for the personal calibration may be similar to that of the interpolation-based methods.

Alternatively or additionally, the eye-tracking module may determine the position of the eye in a captured image by comparing the captured images with one or more previous images having known positions of the eye. For example, the eye-tracking module may include a database of images that are each associated with a reference eye position. By matching the captured image with a stored image, the eye-tracking module may determine that the eye is at the reference eye position associated with the stored image. In some embodiments, the eye-tracking module may identify a feature in a portion of a captured image. The feature may include a diffraction or optical flow pattern associated with a particular portion of eye 650, such as the pupil or the iris. For example, the eye-tracking module may determine the eye position by retrieving a reference eye position associated with the feature (which was also captured in a reference image), determining a pixel shift between the feature in the captured image and the feature in the reference image, and determining the eye position based on the determined pixel shift with respect to the reference eye position and the calibrated distance per pixel as described above.

As discussed above, camera 614 may effectively capture an image of light source 612 reflected by cornea 652 of eye 650. In some embodiments, the eye-tracking module may determine a gaze direction of the user's eye based on the locations of the images of the light sources (e.g., glints) on cornea 652 in the captured image. The gaze direction may be determined by a foveal axis 626 of the user's eyes, where foveal axis 626 (also referred to as "visual axis") may be a line passing through the center of pupil 656 and the center of fovea 662.

Figure 7:
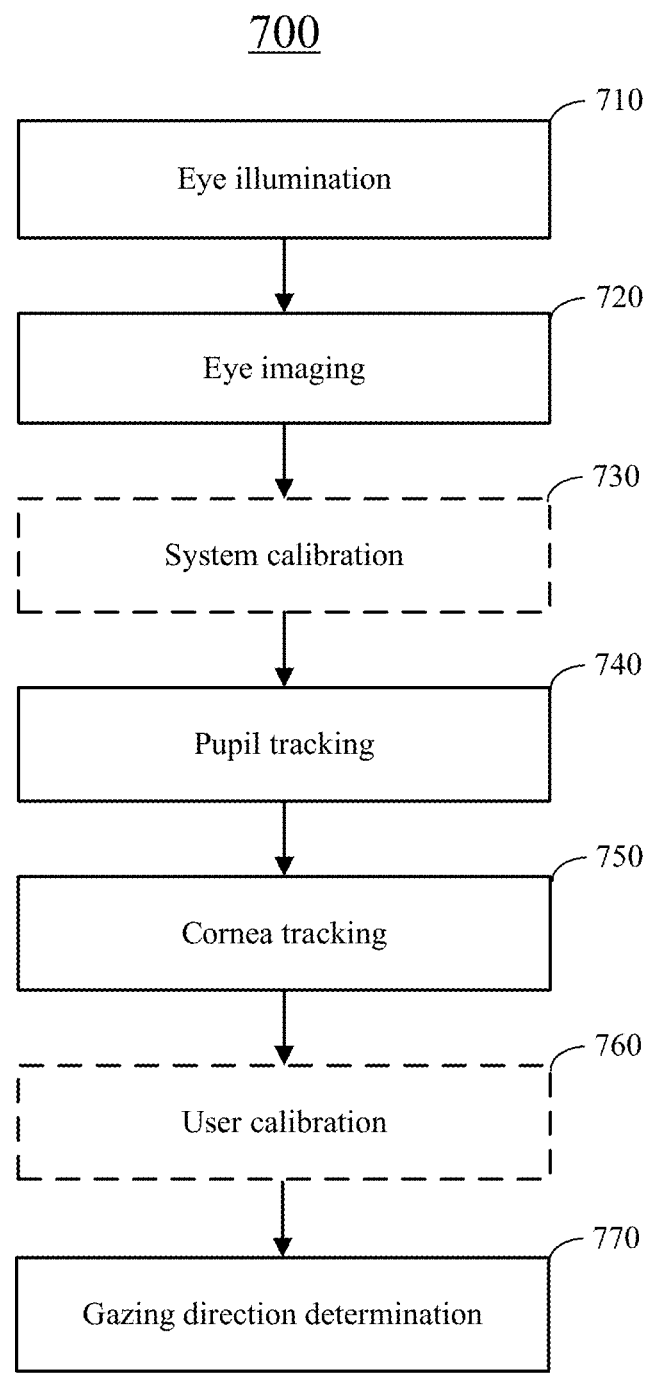
FIG. 7 is a simplified flowchart illustrating an example method for tracking the eye of a user of a near-eye display system according to certain embodiments.

FIG. 7 is a simplified flow chart 700 illustrating an example method for tracking the eye of a user of a near-eye display system according to certain embodiments. The operations in flow chart 700 may be performed by, for example, eye-tracking system 130 or 610 described above. At block 710, one or more light sources may illuminate the user's eye. In various embodiments, the light sources may be located in the field of view of the user's eye or at a periphery of the field of view of the user's eye. In some embodiments, a light source may be located at the periphery of the field of view of the user's eye, and the light from the light source may be guided and directed to the user's eye from locations in the field of view of the user's eye.

At block 720, an imaging device (e.g., a camera) may collect light reflected by the user's eye and generate one or more images of the user's eye. As described above, the cornea of the user's eye may specularly reflect the illumination light, while some portions of the user's eye (e.g., iris) may diffusively scatter the illumination light. The images of the user's eye may include portions (e.g., the iris region and/or the pupil portion) where the contrast may be different due to the scattering of the illumination light. The images of the user's eye may also include glints caused by the specular reflection of the illumination light by the user's cornea.

Figures 8A, 8B:
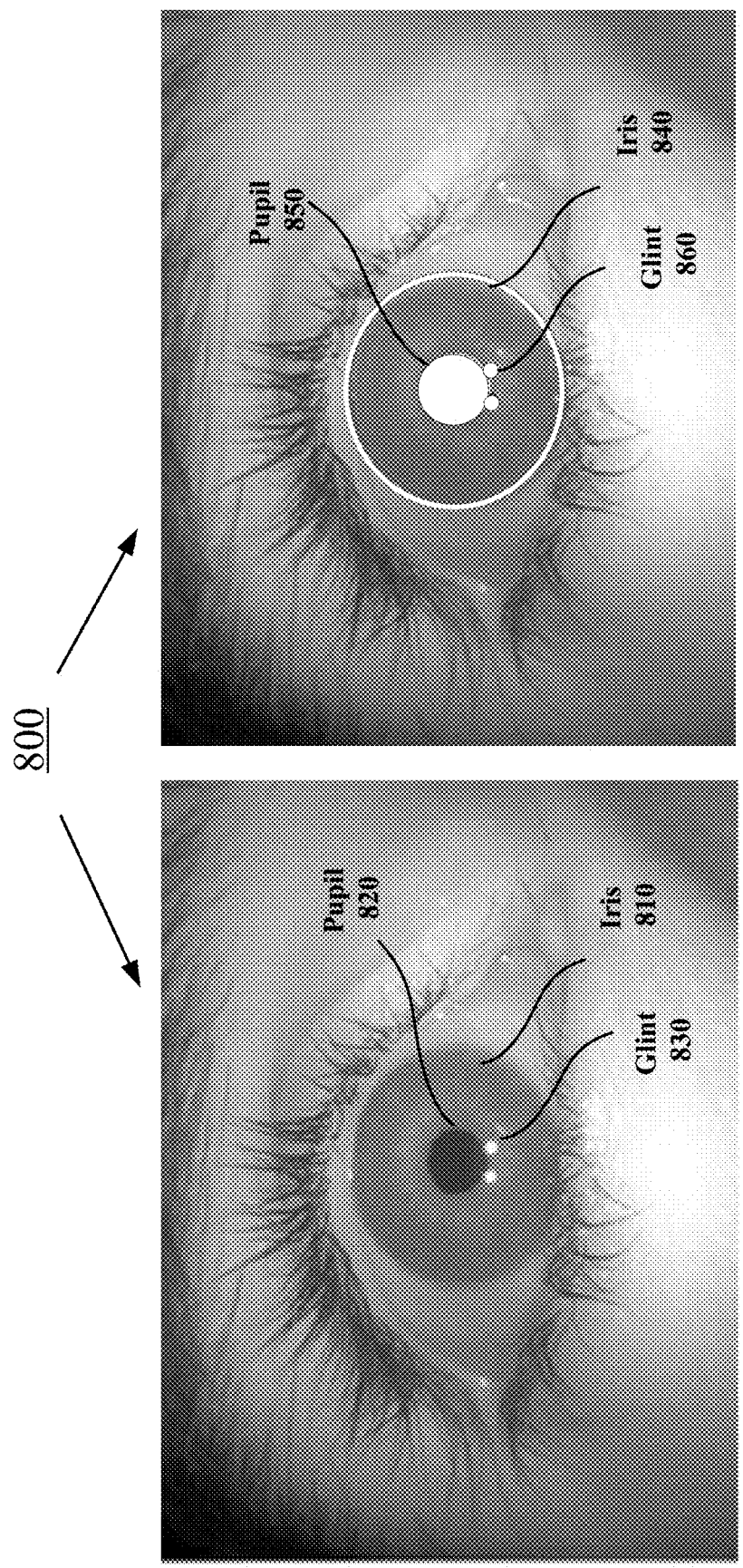
FIG. 8A illustrates an example of an image of a user's eye captured by a camera according to certain embodiments.
FIG. 8B illustrates an example of an identified iris region, an example of an identified pupil region, and examples of glint regions identified in an image of the user's eye according to certain embodiments.

FIG. 8A illustrates an example of an image 800 of a user's eye captured by a camera according to certain embodiments. Image 800 includes an iris region 810, a pupil region 820, and multiple glints 830. Glints 830 may be caused by illumination light specularly reflected off the cornea of the user's eye.

Optionally, at block 730, the eye-tracking system may perform system calibration to improve the precision and accuracy of eye tracking as described above with respect to eye-tracking module 118. The system calibration may include, for example, calibrating the eye tracking optical path (such as extrinsic (e.g., position or orientation) and intrinsic camera parameters), positions of the light sources, the display optical path (e.g., position of the display, extrinsic and intrinsic parameters of the display optics, etc.)

At block 740, the location of the center of the pupil of the user's eye may be determined based on the scattering of the illumination light by, for example, the iris of the user's eye. As described above, the boundaries of the pupil and/or the iris may be determined based on image segmentation of the pupil region in the captured image as shown in FIG. 8A. Based on the boundaries of the pupil, the location of the center of the pupil may be determined.

At block 750, the position of the cornea of the user's eye may be determined based on the locations of the glints in the captured image of the user's eye as shown in FIG. 8A. As described above, the locations of the glints may be determined using, for example, a Gaussian centroiding technique. The accuracy and precision of the determined locations of the glints may depend on the locations of the light sources (or virtual or effective light sources). Based on the locations of two or more glints, the position of the cornea may be determined using, for example, nonlinear optimization and based on the assumption that the cornea (in particular, the corneal apex) is close to a sphere.

FIG. 8B illustrates an example of an identified iris region 840, an example of an identified pupil region 850, and examples of glint regions 860 identified in image 800 of the user's eye according to certain embodiments. As illustrated, edges of iris region 840 and pupil region 850 are identified. The center of pupil region 820 may then be determined based on the edges of pupil region 850 and/or iris region 840. The locations of glints 830 can also be determined based on the locations of glint regions 860 identified in image 800. Based on the locations of glint regions 860, the position of the center of the cornea may be determined.

Optionally, at block 760, the eye-tracking system may perform user calibration to determine certain eye calibration parameters for improving the precision and accuracy of eye tracking as described above with respect to eye-tracking module 118 and FIG. 6. The user calibration may include, for example, determining the eye model parameters (e.g., anatomical eye parameters) or the coefficients of some mapping functions that may not depend on a particular eye parameter. Other examples of the eye calibration parameters may include an estimated average eye radius, an average corneal radius, an average sclera radius, a map of features on the eye surface, and an estimated eye surface contour. As described above, a kappa angle between the pupillary axis (optical axis) and the foveal axis (visual axis) of the use's eye may be different for different users, and thus may need to be calibrated during the calibration. In some embodiments, the calibration may be performed by displaying a set of target points distributed over a display screen according to A certain pattern, and the user is asked to gaze at each of the target points for a certain amount of time. The camera may capture the corresponding eye positions for the target points, which are then mapped to the corresponding gaze coordinates or directions, and the eye-tracking system may then learn the mapping function or the model parameters. In some embodiments, the calibrations at block 730 and 760 may only be performed once when the near-eye display system is put on or moved.

At block 770, the gaze direction of the user's eye may be determined based on, for example, the location of the center of the pupil and the position of the center of the cornea. In some embodiments, the pupillary axis of the use's eye may be determined first and may then be used to determine the foveal axis (or line of sight, gaze direction, or visual axis) of the user's eye, for example, based on an angle between the pupillary axis and the foveal axis.

In many cases, the viewing direction may need to be determined with a high accuracy, such as less than 5°, less than 1, or better. The eye-tracking system may also need to be robust in order to accommodate for extreme changes in the viewing direction and variations in facial features surrounding user's eyes, such as cases where portions of the eye, including portions of the iris or the pupil, may be obscured by, for example, eyelids or eye lashes. Obscurations may often occur when, for example, the user looks in a downward direction or when the user rapidly re-acquires the viewing direction after the eyelids reopens during eye blinks. The accuracy of glint-based eye-tracking systems may depend on the angle between the glint source and the imaging perspective of the camera optics. In addition, with two or more views, a single point calibration may be sufficient for determining the gaze direction. Thus, it is desirable to capture multiple views of the user's eye from different perspectives. While a larger number of cameras in the periphery of the user's field of view may provide multiple views of the eye and help to increase the accuracy and robustness of the eye tracking and reduce the calibration requirements, increasing the number of cameras would cause a higher cost and weight of the tracking system, and a large amount of power consumption, which may not be suitable for wearable devices designed for extended use.

According to certain embodiments, an imaging system for eye tracking may include one or more light sources configured to illuminate a user's eye, a camera for capturing images of the user's eye, and a substrate including two or more light deflectors that are configured to direct light reflected by the user's eye to the camera at different angles to form two or more images of the user's eye in a same image frame. There may be various techniques to implement the two or more light deflectors for capturing two or more images of the user's eye from different perspectives with one camera and one or more light sources. For example, the two or more light deflectors may include any combination of a reflective Fresnel lens, a Fresnel mirror, a reflective grating, a blazed grating, a partial reflective coating, a geometric lens, and a smooth surface at an interface between two different media. In various embodiments, the parameters of the light deflectors, such as the tilt angle of a mirror, the period of the reflective grating, the focal length of the Fresnel lens or geometric lens, may be selected based on the desired deflection angle. The two or more light deflectors may be in different areas on a same surface of a substrate, on different surfaces of the substrate, or on different layers of the substrate.

In various embodiments, the reflective coating may reflect at least 20%, at least 50%, or at least 80% of IR light. In addition, the reflective coating may have a reflectivity less than 20%, less than 5%, or less than 1% for visible light. In various embodiments, the Fresnel lens or geometric lens may have a spherical, aspherical, cylindrical, or free-formed shape, or any combination of these shapes. The Fresnel lens or geometric lens may be symmetric around its center, or may be non-symmetric.

Figure 9:
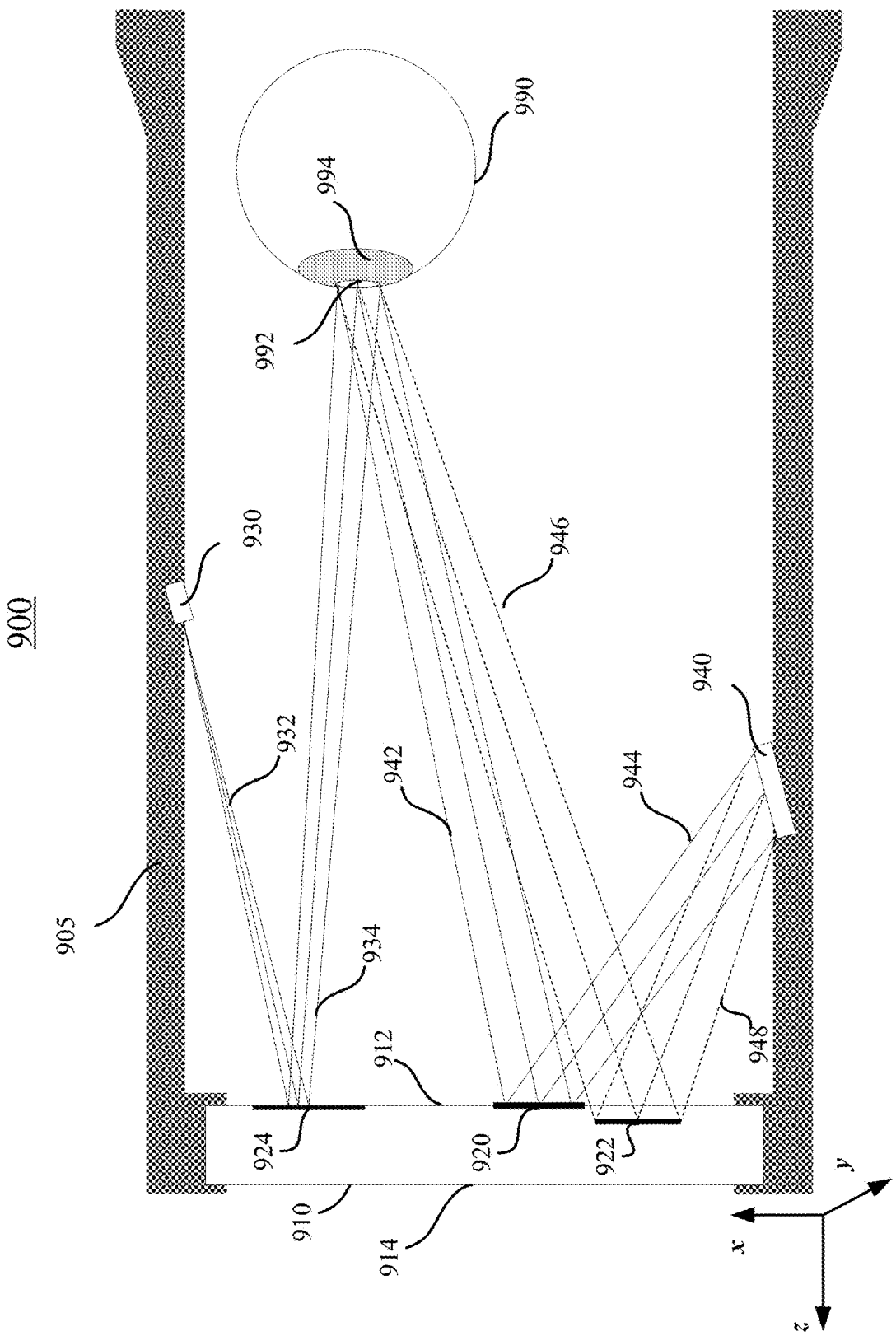
FIG. 9 is a cross-sectional view of an example eye-tracking system in an example near-eye display system according to certain embodiments.

FIG. 9 is a cross-sectional view of an example eye-tracking system in an example near-eye display system 900 according to certain embodiments. Near-eye display system 900 may include a frame 905 and display optics coupled to or embedded in frame 905. Frame 905 may be in the form of, for example, eyeglasses. The display optics may include a substrate 910 and one or more light deflectors formed on or embedded in substrate 910. The eye-tracking system may include one or more light sources 930, a camera 940, and the one or more light deflectors 920, 922, 924 on substrate 910.

Substrate 910 may be similar to substrate 420 described above, and may include a flat or curved substrate that may be transparent to both invisible light (e.g., IR or NIR light) and visible light. The light deflectors may include any one of a reflective Fresnel lens, a Fresnel mirror, a reflective grating, a partial reflective coating, a geometric lens, or a smooth surface at an interface between two media having different refractive indexes. Light source(s) 930 may be positioned in a periphery of the field of view of the user's eye, such as attached to or embedded in frame 905. Light source(s) 930 may emit light outside of visible band, such as infrared light. In some embodiments, the one or more light sources 930 may include a light emitting device (e.g., a light emitting diode (LED), a laser diode, or vertical cavity surface emitting lasers (VCSELs)) and collimating optics for collimating or otherwise modifying the light emitted by the light emitting device. Camera 940 may be positioned in a periphery of the field of view of the user's eye, such as attached to or embedded in frame 905. Camera 940 may be sensitive to invisible light (e.g., IR light) and may be similar to camera 614 described above.

As shown in FIG. 9, a light deflector 924 (e.g., a reflector) may direct illumination light 932 from light source 930 as illumination light 934 towards user's eye 990 to illuminate user's eye 990. Light deflector 924 may include, for example, a surface of substrate 910, a reflective coating, a Fresnel mirror, a reflective grating working at invisible band, a reflective mirror working at invisible band, a reflective Fresnel lens, etc. In some embodiments, illumination light from light source 930 may be coupled into substrate 910 at a certain angle from a side or a surface of the waveguide (e.g., through a prism, a grating coupler, a slanted surface, etc.) such that the light can propagate within the substrate due to total internal reflection. The illumination light may be coupled out of substrate 910 during propagation within substrate 910, for example, by one or more couplers, such as grating couplers. The illumination light may be reflected by the cornea 992, iris 994, and other parts of user's eye 990 as illumination light 942 back to substrate 910.

Illumination light 942 reflected by user's eye 990 may be reflected by two or more light deflectors (such as light deflectors 920 and 922) on substrate 910 towards camera 940. The two or more light deflectors may be in different areas on a same surface of substrate 910, may be on different surfaces (e.g., surface 912 and surface 914) of substrate 910, may be both embedded in substrate 910, or may include at least one light deflector on a surface of substrate 910 and at least one light deflector embedded in substrate 910. The two or more light deflectors may include any combination of, for example, reflective Fresnel lenses with reflective coating, Fresnel mirrors, tilted concave or flat mirrors (e.g., dichroic mirrors, such as hot mirrors through which the visible light may be transmitted substantially unaffected, whereas the near infrared light or infrared light may be reflected), reflective gratings, diffractive optical elements (DOEs), holographic optical elements (HOEs), reflective thin film coating, etc. In one example, Fresnel lens facets may be formed on surface 912 or 914 of substrate 910, and a reflective coating may be coated on the Fresnel lens facets to reflect at least a portion of the illumination light reflected by user's eye 990 towards camera 940. The two or more light deflectors may receive different portions of illumination light reflected by the user's eye (as indicated by illumination light 942 and 946), and may deflect the different portions of illumination light reflected by the user's eye at different directions towards camera 940 (as indicated by light rays 944 and 948). Camera 940 may generate two or more images of user's eye 990 from different perspectives using the different portions of illumination light deflected by the two or more light deflectors (as indicated by light rays 944 and 948).

As such, an image frame generated by camera 940 may include two or more images of user's eye 990, each corresponding to a different perspective and formed at a different location on the image frame. Each image may also include one or more (e.g., two or more) glints on the cornea of the user's eye, where the glints may correspond to different light sources. Based on the two or more images of the user's eye 990 in the image frame and the configuration of the two or more light deflectors that are used to form the two or more images, the position of the user's eye 990 and the gaze direction may be determined.

FIG. 10A illustrates eye imaging using a first light deflector 1012 in an example eye-imaging unit 1000 of a near-eye display system according to certain embodiments. Eye-imaging unit 1000 may include a substrate 1010 that includes a first light deflector 1012 and a second light deflector 1014. In the example shown in FIG. 10A, first light deflector 1012 may be formed on a surface of substrate 1010, and second light deflector 1014 may be immersed in substrate 1010 or on a surface 1016 of substrate 1010. First light deflector 1012 may partially reflect illumination light 1030 (e.g., invisible light in IR or NR band) that is generated by one or more light sources (not shown in FIG. 10A) and reflected by a user's eye 1090 towards a camera as shown by light rays 1034. Illumination light 1030 may include light from two or more light sources or two or more imaginary sources that are generated from one physical source. The camera may include a lens assembly 1040 that can collect light rays 1034 and form a first image of the user's eye in an area 1052 on an image sensor 1050 of the camera. The first image of the user's eye may include two or more glints as described above with respect to FIGS. 8A and 8B. As described above, first light deflector 1012 may include a reflective Fresnel lens with reflective coating for IR or NR light, a Fresnel mirror, a tilted concave or flat mirror (e.g., dichroic mirror, such as hot mirror), a reflective grating, a diffractive optical element (DOE), a holographic optical element (HOE), a reflective thin film coating that has a high reflection for invisible light (e.g., IR light) and a low reflection for visible light, etc.

FIG. 10B illustrates eye imaging using a second light deflector 1014 in example eye-imaging unit 1000 of the near-eye display system according to certain embodiments. In the example shown in FIG. 10B, second light deflector 1014 may be immersed in substrate 1010 or on surface 1016, and may partially reflect illumination light 1030 (e.g., invisible light in IR or NIR band) that is generated by one or more light sources (not shown in FIG. 10B) and reflected by a user's eye 1090 towards a camera as shown by light rays 1032. Illumination light 1030 may include light from two or more light sources or two or more imaginary sources that are generated from one physical source. Lens assembly 1040 of the camera may collect light rays 1032 and form a second image of the user's eye in an area 1054 on image sensor 1050 of the camera. The second image of the user's eye may include two or more glints corresponding to two or more light sources as described above with respect to FIGS. 8A and 8B. As first light deflector 1012, second light deflector 1014 may include a reflective Fresnel lens with reflective coating for IR or NIR light, a Fresnel mirror, a tilted concave or flat mirror (e.g., dichroic mirror, such as hot mirror), a reflective grating, a diffractive optical element (DOE), a holographic optical element (HOE), a reflective thin film coating that has a high reflection for invisible light (e.g., IR light) and a low reflection for visible light, etc.

FIGS. 10A and 10B show two light deflectors arranged on different layers of a vertical stack of the substrate (at different locations in the z direction). Other arrangements of the two or more light deflectors may also be used. For example, the two or more light deflectors may be arranged in different areas of a same plane or surface or may be interleaved.

Figure 11B:
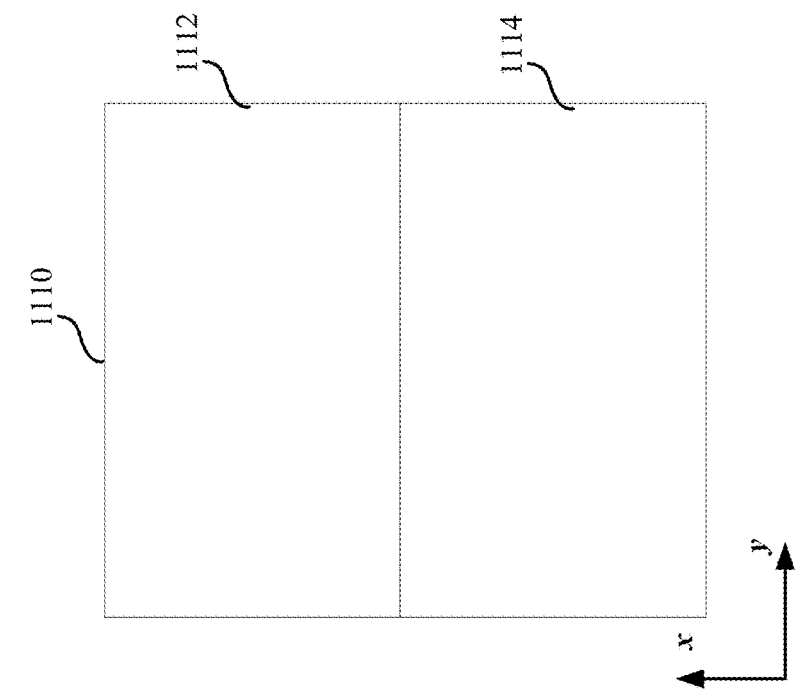
FIG. 11B is a side view of an example eye-imaging unit in a near-eye display system according to certain embodiments.
Figure 11A:
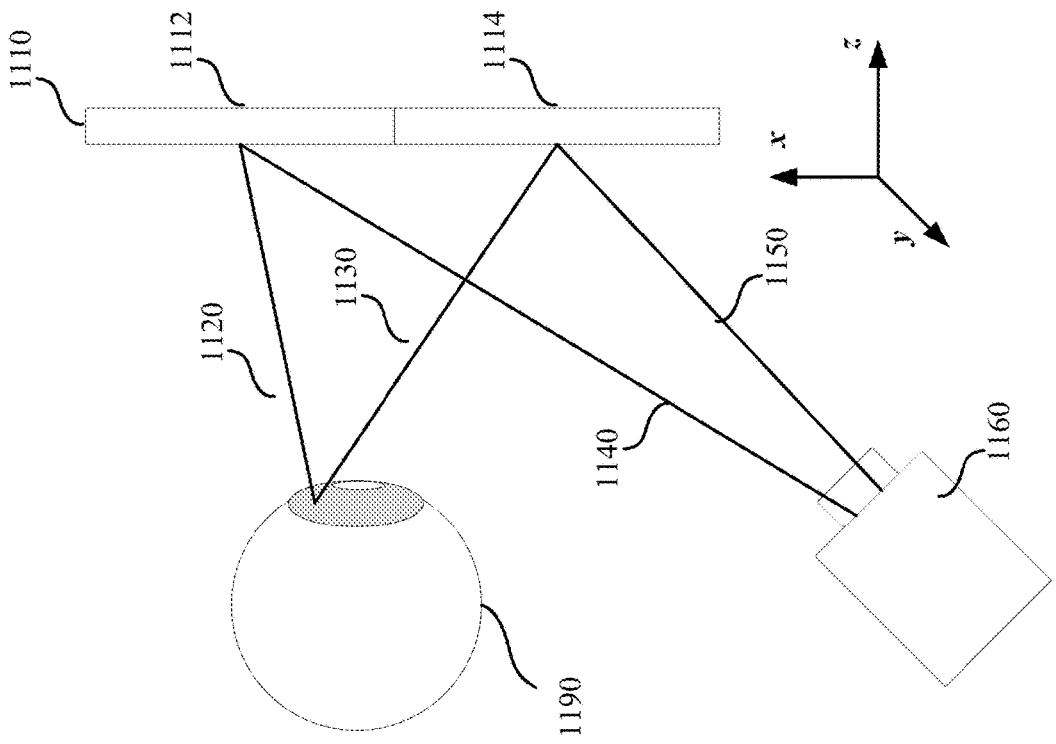
FIG. 11A is a top view of an example eye-imaging unit in a near-eye display system according to certain embodiments.

FIG. 11A is a top view of an example eye-imaging unit 1100 in a near-eye display system according to certain embodiments. FIG. 11B is a side view of eye-imaging unit 1100 in the near-eye display system according to certain embodiments. Eye-imaging unit 1100 includes a substrate 1110 and a camera 1160. Substrate 1110 may be a waveguide-based display substrate and may function as a combiner as described above with respect to, for example, FIG. 4. Substrate 1110 may include a first region 1112 and a second region 1114 arranged in the x direction as shown in FIG. 11B, where each region may include, for example, a Fresnel lens, a Fresnel mirror, a geometric lens, a reflective grating, a smooth surface, or any other light deflector described above. First region 1112 and second region 1114 may be uncoated or may be coated with a reflective coating on one or more surfaces. As described above, the reflective coating may reflect at least 20%, at least 50%, or at least 80% of IR light. In addition, the reflective coating may have a reflectivity less than 20%, less than 5%, or less than 1% for visible light.

First region 1112 may reflect a portion of illumination light reflected by a user's eye 1190 (shown by chief ray 1120) towards camera 1160 as shown by chief ray 1140. Second region 1114 may reflect a portion of illumination light reflected by user's eye 1190 (shown by chief ray 1130) towards camera 1160 as shown by chief ray 1150. Camera 1160 may thus form two images of user's eye 1190 having different perspectives using light rays reflected by first region 1112 and second region 1114 (as represented by chief rays 1140 and 1150).

FIG. 12A is a top view of an example eye-imaging unit 1200 in a near-eye display system according to certain embodiments. FIG. 12B is a side view of example eye-imaging unit 1200 in the near-eye display system according to certain embodiments. Eye-imaging unit 1200 may include a substrate 1210 and a camera 1280. Substrate 1210 may be a waveguide-based display substrate and may function as a combiner as described above with respect to, for example, FIG. 4. Substrate 1210 may include a first region 1212, a second region 1214, and a third region 1216 arranged in an array in the x direction, where each region may include a Fresnel lens, a Fresnel mirror, a geometric lens, a reflective grating, a smooth surface, or any other light deflector described above. First region 1212, second region 1214, and third region 1216 may be uncoated or may be coated with a reflective coating on one or more surfaces. As described above, the reflective coating may reflect at least 20%, at least 50%, or at least 80% of IR light. In addition, the reflective coating may have a reflectivity less than 20%, less than 5%, or less than 1% for visible light. In some embodiments, the first region, second region, and third region may be arranged in they direction.

First region 1212 may reflect a portion of illumination light reflected by a user's eye 1290 (shown by chief ray 1220) towards camera 1260 as shown by chief ray 1250. Second region 1214 may reflect a portion of illumination light reflected by user's eye 1290 (shown by chief ray 1230) towards camera 1280 as shown by chief ray 1260. Third region 1216 may reflect a portion of illumination light reflected by user's eye 1290 (shown by chief ray 1240) towards camera 1280 as shown by chief ray 1270. Camera 1280 may thus form three images of user's eye 1290 from different perspectives using light rays reflected by first region 1212, second region 1214, and third region 1216 (as represented by chief rays 1250, 1260, and 1270).

Figures 13A, 13B:
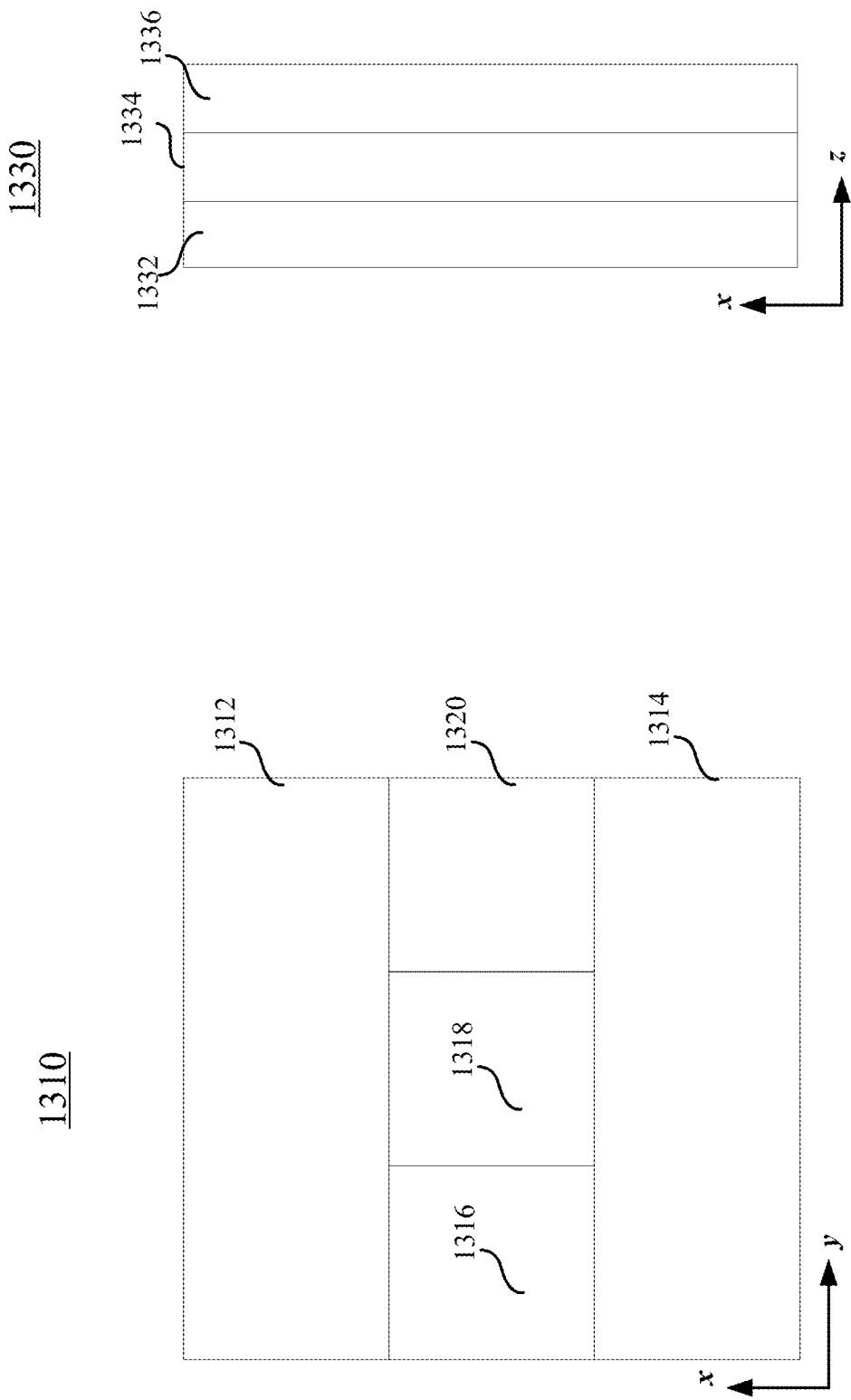
FIG. 13A illustrates an example arrangement of multiple light deflectors in an example eye-imaging unit of a near-eye display system according to certain embodiments.
FIG. 13B illustrates an example arrangement of multiple light deflectors in an example eye-imaging unit of a near-eye display system according to certain embodiments.

FIG. 13A illustrates an example arrangement of multiple light deflectors on a substrate 1310 of an example eye-imaging unit in a near-eye display system according to certain embodiments. The light deflectors may include any type of light deflectors described above, and may be arranged in different regions on a x-y plane. For example, the light deflectors may include five light deflectors 1312, 1314, 1316, 1318, and 1320. Light deflectors 1312 and 1314 may locate at two sides of the substrate and may have a larger area, while light deflectors 1316, 1318, and 1320 may locate at the center of the substrate and may have a smaller area. Such an arrangement may help to improve the uniformity of the brightness of the multiple images.

FIG. 13B illustrates an example arrangement of multiple light deflectors on a substrate 1330 of an example eye-imaging unit in a near-eye display system according to certain embodiments. The light deflectors may include any type of light deflectors described above, and may be arranged on different substrate layers in a stack in the z direction. For example, the light deflectors may include one or more light deflectors in each of a first layer 1332, a second layer 1334, and a third layer 1336, as described above with respect to FIGS. 11A-13A. Some light deflectors may have a reflectivity less than about 80%, less than about 50%, or less than about 30% for the invisible light reflected by the user's eye and may allow other portions of the invisible light reflected by the user's eye to pass through and reach other light deflectors on the next layer in the stack.

In some embodiments, the light deflectors may be on a same surface or layer of the substrate, and may each include multiple interleaved or interlaced zones. The interleaved or interlaced zones may have any desired shape, such as circular rings, elliptical rings, rectangles, trapezoids, etc.

FIG. 14A illustrates two interleaved light deflectors 1410 and 1420 on a same surface of a substrate 1400 in an example eye-imaging unit of a near-eye display system according to certain embodiments. As illustrated, in the example eye-imaging unit, light deflector 1410 may include multiple rings or annuli that form, for example, a Fresnel mirror, a reflective Fresnel lens, or any type of light deflectors described above. Light deflector 1410 may be configured to direct light reflected by a user's eye towards a camera to form a first image of the user's eye. Light deflector 1420 may also include multiple rings or annuli that form, for example, a Fresnel mirror, a reflective Fresnel lens, or any type of light deflectors described above. The multiple rings for light deflector 1420 may be located between the multiple rings of light deflector 1410, such that light deflector 1410 and light deflector 1420 may be interleaved or interlaced. Light deflector 1420 may be configured to direct light reflected by the user's eye towards the camera to form a second image of the user's eye.

FIG. 14B illustrates two interleaved light deflectors 1460 and 1470 on a same surface of a substrate 1450 in an example eye-imaging unit of a near-eye display system according to certain embodiments. In the example shown in FIG. 14B, light deflector 1460 and light deflector 1470 may each include multiple rectangular zones that form, for example, a linear Fresnel mirror, a reflective Fresnel lens, or any type of light deflectors described above. The multiple rectangular zones of light deflector 1460 and the multiple rectangular zones of light deflector 1470 may be interleaved as shown in FIG. 14B. Light deflector 1460 and light deflector 1470 may be configured to direct light reflected by the user's eye towards the camera at different directions to form two images of the user's eye from different perspectives as described above.

Figure 15:
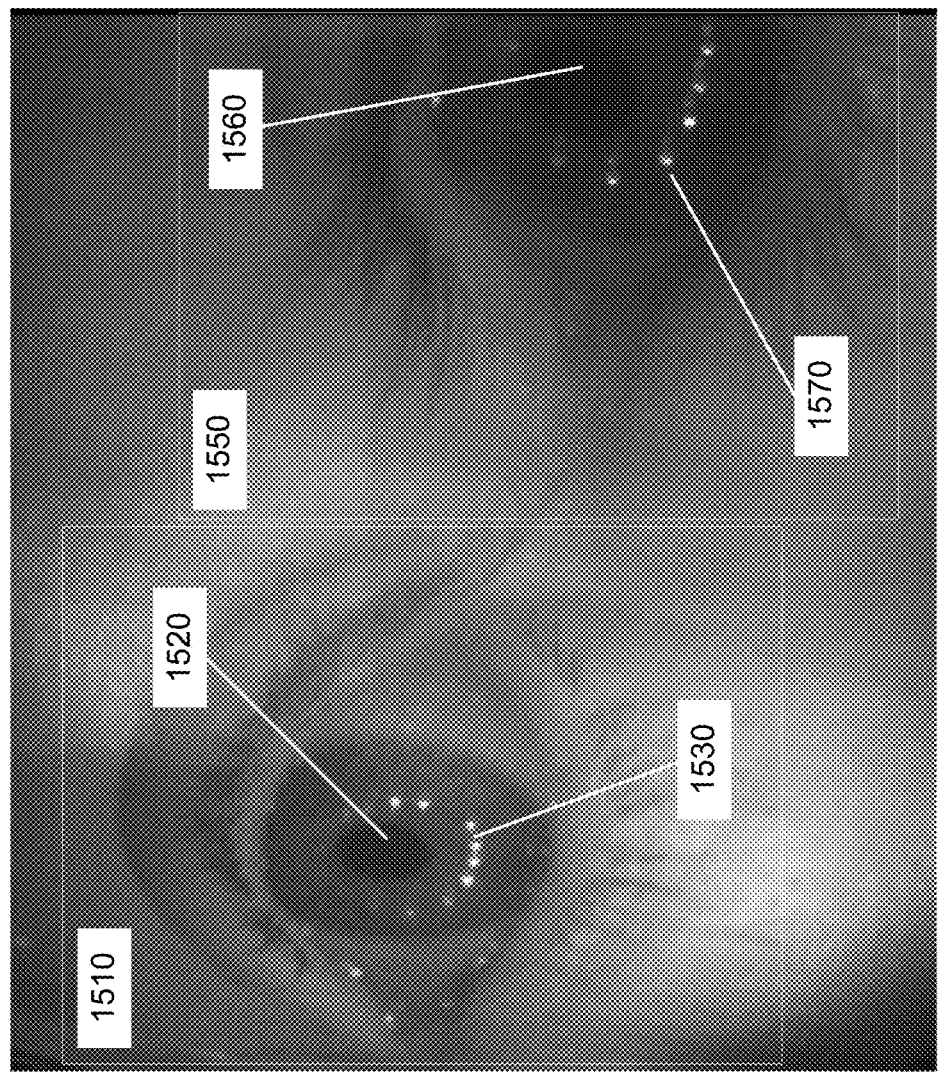
FIG. 15 illustrates an example image frame including multiple images of a user's eye captured from different perspectives by a single camera according to certain embodiments.

FIG. 15 illustrates an example image frame 1500 including multiple images of a user's eye captured from different perspectives by a single camera according to certain embodiments. Image frame 1500 may be formed by, for example, eye-imaging unit 1000, eye-imaging unit 1100, or the eye-imaging unit described with respect to FIGS. 14A and 14B. Image frame 1500 may include two images 1510 and 1550 of the user's eye. Image 1510 may be generated by a first light deflector, and shows pupil area 1520 of the user's eye and multiple glints 1530. Image 1550 may be generated by a second light deflector, and shows pupil area 1560 of the user's eye and multiple glints 1570. In the example shown in FIG. 15, the first light deflector may have a higher reflectivity than the second light deflector, and thus image 1510 may be brighter than image 1550. In some embodiments, the reflectivity of light deflectors may be adjusted (e.g., by coating the surface) such that the two or more images may have the same brightness. In addition, image 1510 and image 1550 in image frame 1500 correspond to a same eye of a user viewed from different perspectives (or viewing angles). Thus, one camera is used to simultaneously generate two or more images of an eye from different perspectives (or viewing angles). The two or more images can then be used to determine the position of the user's eye and the gaze direction of the user's eye as described above.

In many eye tracking applications, it may be a challenging task to reduce the power consumption of the eye-tracking system and reduce heat generated by the eye-tracking system. For example, continuously capturing the images of the user's eye and computing the gaze direction based on the images of the user's eye in real time can also consume a substantial amount of power. According to certain embodiments, the power consumption of the camera for capturing the images of the user's eye and the power used to calculate the gaze direction of the user's eye can be reduced by only capturing and processing a fraction of each image of the user's eye formed on the image sensor, such as the fraction of the image that only includes the pupil region and the glints. The eye-tracking system may switch between recording and processing a large field of view of the camera, and recording and processing only a fraction of the field of view of the camera. For example, the eye-tracking system may record and process the full image formed on the image sensor of the camera to provide calibration or the absolute position of the eye, and then record and process only fractional regions of the image that include the glints and/or the pupil region. Recording only a small portion of the available image may also allow the eye-tracking system to operate at higher frame rates without consuming excessive power. Higher frame rates may allow for more rapid updates of the gaze direction of the user's eye.

Figure 16:
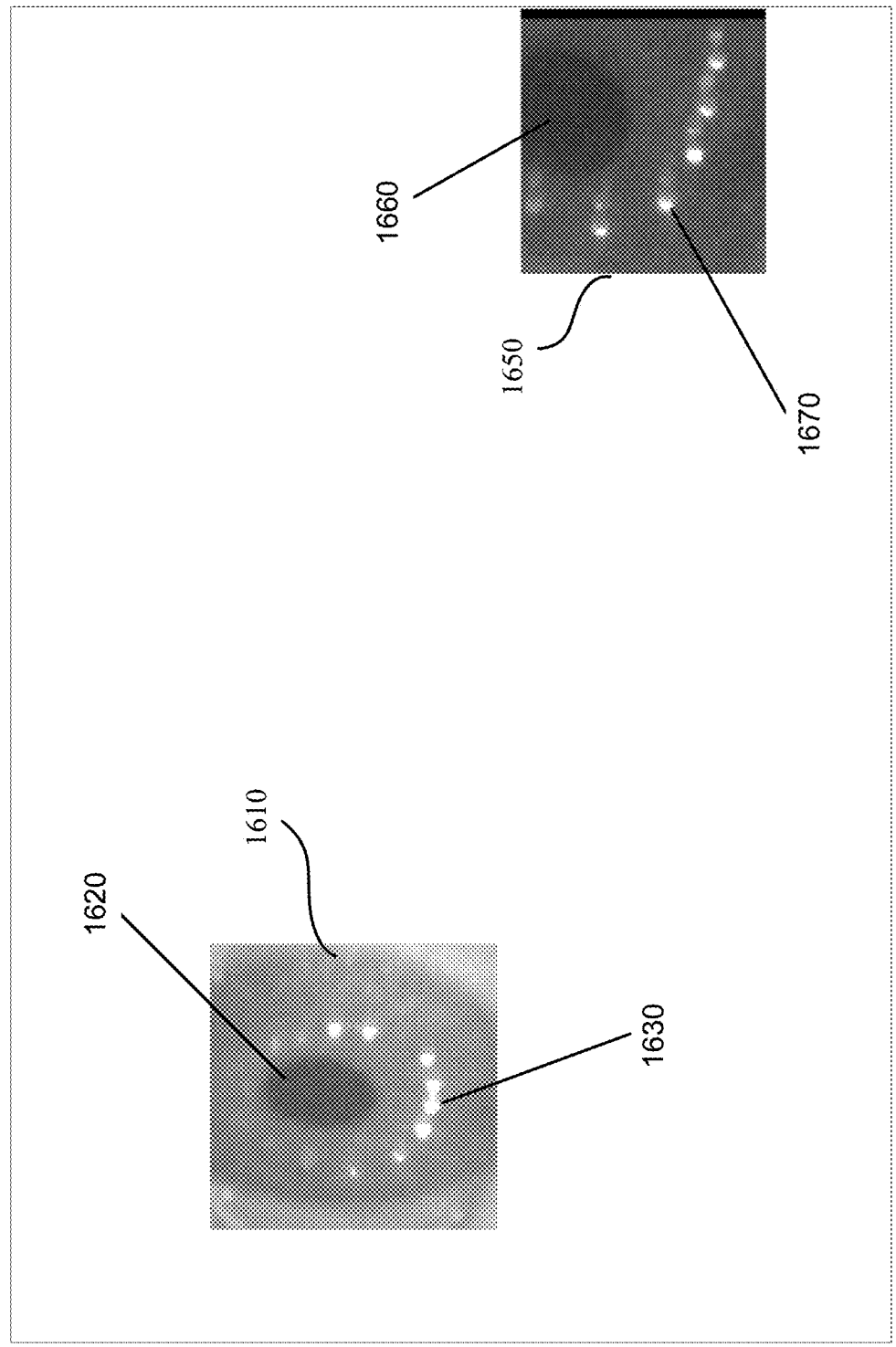
FIG. 16 illustrates an example image frame including fractional regions of multiple images of a user's eye captured from different perspectives by a single camera according to certain embodiments.

FIG. 16 illustrates an example image frame 1600 including fractional regions of multiple images of a user's eye captured from different perspectives by a single camera according to certain embodiments. Image frame 1600 may only include regions of interest 1610 and 1650 in image frame 1500. The regions of interest in image frame 1600 can be captured by only reading data from pixels on the image sensor corresponding to the regions of interest. The regions of interest may include the pupil region of the user's eye, such as pupil region 1620 and pupil region 1650, and some or all glints, such as glint 1630 and glint 1670. The regions of interest may be determined by analyzing the full images, such as image frame 1500, to determine the iris regions, pupil regions, and glints using, for example, Gaussian centroiding techniques or other techniques described above with respect to FIGS. 1, 7, and 8B. The eye-tracking system may then only process the information in the regions of interest to determine the position of the user's eye and/or the gaze direction of the user's eye. Because the regions of interest 1610 and 1650 are much smaller than the area of image frame 1500, the power consumption for capturing and processing image frame 1600 to determine the eye position or gaze direction can be significantly reduced.

Figure 17:
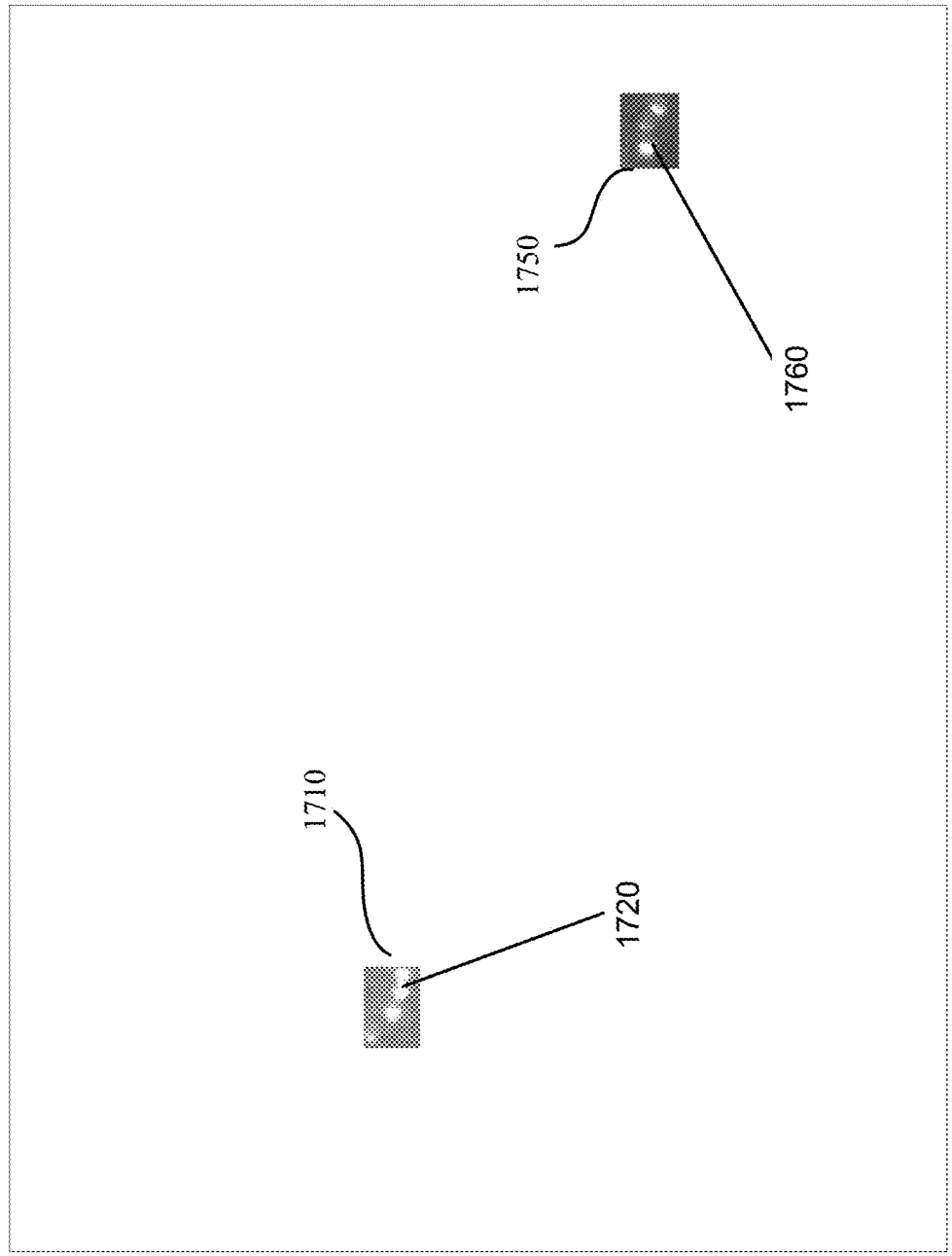
FIG. 17 illustrates an example image frame including fractional regions of multiple images of a user's eye captured from different perspectives by a single camera according to certain embodiments.

FIG. 17 illustrates an example image frame 1700 including fractional regions of multiple images of a user's eye captured from different perspectives by a single camera according to certain embodiments. Image frame 1700 may only include regions of interest 1710 and 1750 in image frame 1500 that may only include some glints 1720 and 1760. Regions of interest 1710 and 1750 may be part of regions of interest 1610 and 1650, and may thus be even smaller than regions of interest 1610 and 1650. Therefore, the power consumption for capturing and processing image frame 1700 to determine the eye position or gaze direction can be further reduced.

Figure 18:
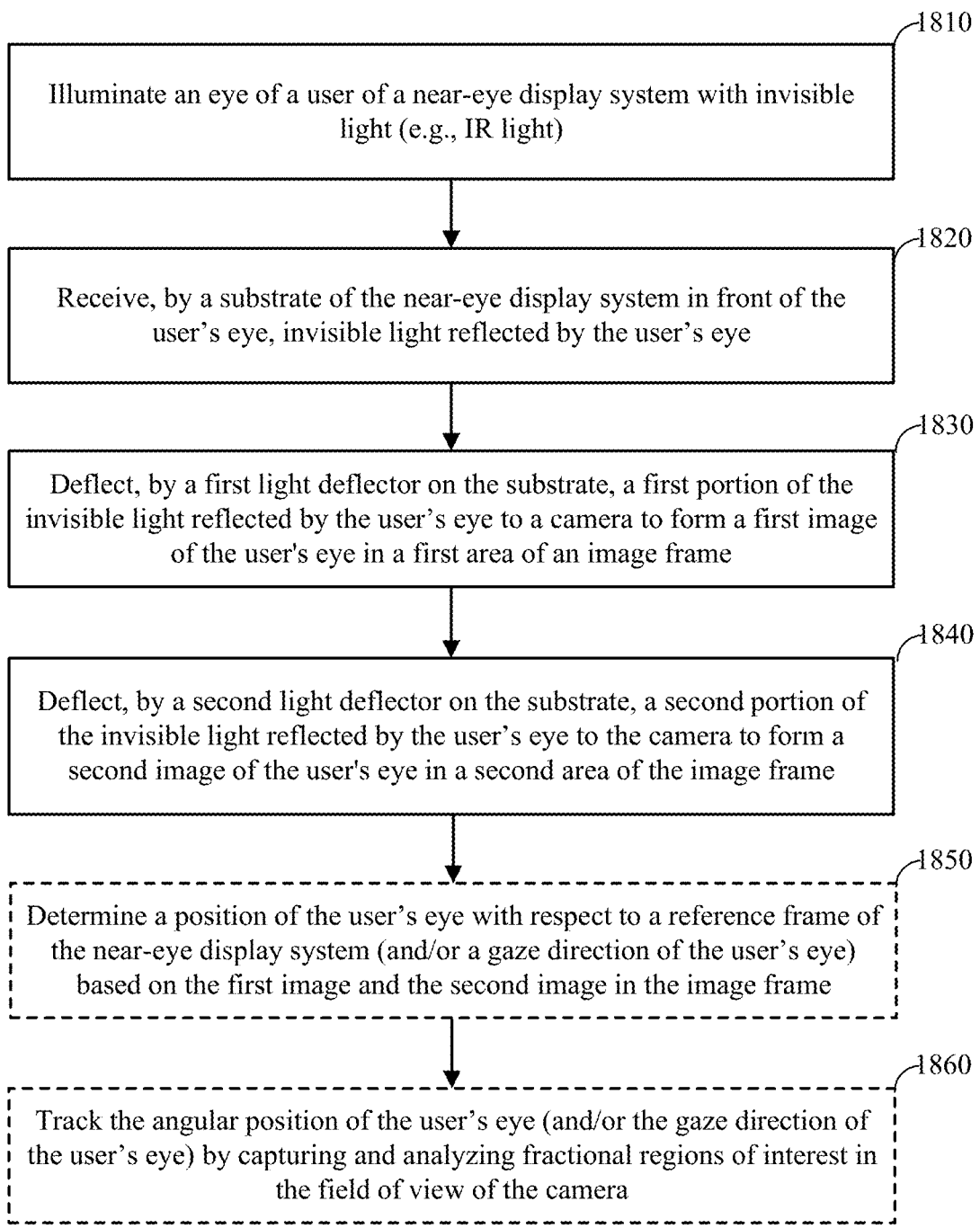
FIG. 18 is a simplified flow chart illustrating an example method for tracking the eye of a user of a near-eye display system from different perspectives using a single camera according to certain embodiments.

FIG. 18 is a simplified flow chart 1800 illustrating an example method for tracking the eye of a user of a near-eye display system from different perspectives using a single camera according to certain embodiments. The operations described in flow chart 1800 are for illustration purposes only and are not intended to be limiting. In various implementations, modifications may be made to flow chart 1800 to add additional operations, omit some operations, combine some operations, split some operations, or reorder some operations. The operations described in flow chart 1800 may be performed using, for example, eye-tracking system 180, near-eye display system 900, eye-imaging unit 1000, or the example eye-imaging units described above with respect to FIGS. 11A-14B.

At block 1810, one or more light sources may emit invisible light, such as infrared light, for illuminating the eye of the user. The one or more light sources may include an LED, a laser diode, or a VCSEL. The one or more light sources may be positioned at the periphery of the field of view of the user's eye. For example, in some embodiments, the one or more light sources may be positioned on a frame of the near-eye display system. In some embodiments, the invisible light may be coupled into a substrate of the near-eye display system, such as a waveguide-based display substrate as described above with respect to, for example, FIG. 4. The substrate may include a glass, quartz, plastic, polymer, ceramic, or crystal material. The invisible light may propagate within the substrate, for example, through total internal reflection, and may be coupled out of the substrate and directed towards the user's eye. In some embodiments, one or more light deflectors may be formed on the substrate, and may deflect the invisible light from the one or more light sources to the user's eye for eye illumination.

At block 1820, the substrate of the near-eye display system positioned in front of the user's eye may receive invisible light reflected by the user's eye. As described above, different areas of the user's eye may reflect the invisible light in different manners. The reflected invisible light may reach different areas of the substrate of the near-eye display system at various angles. The substrate may be flat or curved.

At block 1830, a first light deflector on the substrate may deflect a first portion of the invisible light reflected by the user's eye to a camera to form a first image of the user's eye in a first area of an image frame. The first light deflector may be in the field of view of the user's eye and may be on a surface of the substrate or embedded within the substrate. The first light deflector may include, for example, a reflective Fresnel lens, a Fresnel mirror, a dichroic mirror, a reflective grating, a blazed grating, a partial reflective coating, a geometric lens, a diffractive optical element, a holographic optical element, a reflective thin film coating, a smooth surface at an interface between two different media, or any other light deflector described above. In some embodiments, the first light deflector may include a plurality of zones, such as rectangular zones or ring-shaped zones. The first light deflector may be configured to deflect light at desired directions by selecting the parameters of the first light deflector, such as the tilt angle of a mirror, the period of the reflective grating, the focal length of the Fresnel lens or geometric lens. In some embodiments, to increase the reflectivity of the first light deflector, the first light deflector may include a reflective coating configured to at least partially reflect invisible light and transmit visible light. As described above, the reflective coating may reflect at least 20%, at least 50%, or at least 80% of IR light. In addition, the reflective coating may have a reflectivity less than 20%, less than 5%, or less than 1% for visible light. Light reflected by the first light deflector may be collected by a lens of the camera and form an image of the user's eye. The image of the user's eye may include one or more glints corresponding to one or more light sources as described above.

At block 1840, a second light deflector on the substrate may deflect a second portion of the illumination light reflected by the user's eye to the camera to form a second image of the user's eye in a second area of the image frame. The second light deflector may include, for example, a reflective Fresnel lens, a Fresnel mirror, a dichroic mirror, a reflective grating, a blazed grating, a partial reflective coating, a geometric lens, a diffractive optical element, a holographic optical element, a reflective thin film coating, a smooth surface at an interface between two different media, or any other light deflector described above. The first light deflector and the second light deflector may be arranged along x, y, and/or z directions in a 3-D space. For example, in some embodiments, the first light deflector and the second light deflector are on opposite surfaces of the substrate. In some embodiments, the first light deflector and the second light deflector may be in different regions on a same surface or layer of the substrate. In some examples, the first light deflector may include a first plurality of zones, the second light deflector may include a second plurality of zones, and the first plurality of zones may be interleaved with the second plurality of zones. In some embodiments, the first plurality of zones and the second plurality of zones may include rectangular zones or ring-shaped zones. In some embodiments, the first light deflector and the second light deflector may be on different layers of the substrate.

Optionally, at block 1850, a position of the user's eye with respect to a reference frame (e.g., the frame, a reflector, a camera, etc.) of the near-eye display system may be determined based on the first image and the second image in the image frame, as described above with respect to, for example, FIGS. 1 and 6-8. As also described above, in some embodiments, the gaze direction of the user's eye may further be determined based on the determined eye position.

Optionally, at block 1860, the eye-tracking system may continue to track the position of the user's eye (and/or the gaze direction of the user's eye) by capturing and analyzing fractional regions of interest in the field of view of the camera. As described above, the regions of interest may be determined by analyzing the image frame used at block 1850, such as image frame 1500, to determine the iris regions, pupil regions, and glints using, for example, Gaussian centroiding techniques or other techniques described above with respect to FIGS. 1, 7, and 8B. The eye-tracking system may then only capture and process the information in the regions of interest in the subsequent image frames to determine the position of the user's eye and/or the gaze direction of the user's eye. In this way, the power consumption for capturing and processing the image frame to determine the eye position or gaze direction can be significantly reduced.

Embodiments of the invention may be used to fabricate components of an artificial reality system or may be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 19:
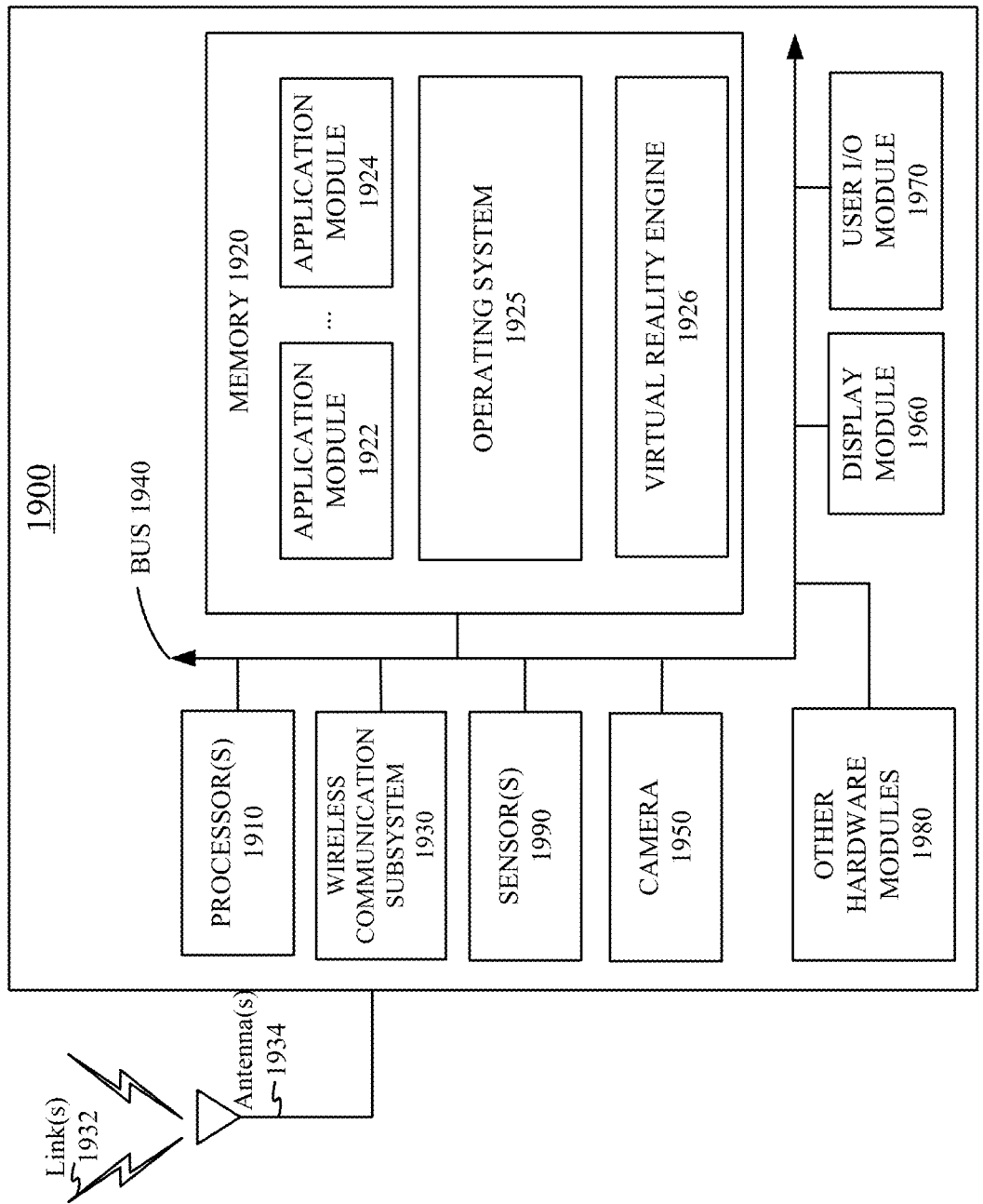
FIG. 19 is a simplified block diagram of an example of an electronic system of a near-eye display system according to certain embodiments.

FIG. 19 is a simplified block diagram of an example of an electronic system 1900 of a near-eye display system (e.g., HMD device) for implementing some of the examples disclosed herein. Electronic system 1900 may be used as the electronic system of an HMD device or other near-eye display systems described above. In this example, electronic system 1900 may include one or more processor(s) 1910 and a memory 1920. Processor(s) 1910 may be configured to execute instructions for performing operations at a number of components, and can be, for example, a general-purpose processor or microprocessor suitable for implementation within a portable electronic device. Processor(s) 1910 may be communicatively coupled with a plurality of components within electronic system 1900. To realize this communicative coupling, processor(s) 1910 may communicate with the other illustrated components across a bus 1940. Bus 1940 may be any subsystem adapted to transfer data within electronic system 1900. Bus 1940 may include a plurality of computer buses and additional circuitry to transfer data.

Memory 1920 may be coupled to processor(s) 1910. In some embodiments, memory 1920 may offer both short-term and long-term storage and may be divided into several units. Memory 1920 may be volatile, such as static random access memory (SRAM) and/or dynamic random access memory (DRAM) and/or non-volatile, such as read-only memory (ROM), flash memory, and the like. Furthermore, memory 1920 may include removable storage devices, such as secure digital (SD) cards. Memory 1920 may provide storage of computer-readable instructions, data structures, program modules, and other data for electronic system 1900. In some embodiments, memory 1920 may be distributed into different hardware modules. A set of instructions and/or code might be stored on memory 1920. The instructions might take the form of executable code that may be executable by electronic system 1900, and/or might take the form of source and/or installable code, which, upon compilation and/or installation on electronic system 1900 (e.g., using any of a variety of generally available compilers, installation programs, compression/decompression utilities, etc.), may take the form of executable code.

In some embodiments, memory 1920 may store a plurality of application modules 1922 through 1924, which may include any number of applications. Examples of applications may include gaming applications, conferencing applications, video playback applications, or other suitable applications. The applications may include a depth sensing function or eye tracking function. Application modules 1922-1324 may include particular instructions to be executed by processor(s) 1910. In some embodiments, certain applications or parts of application modules 1922-1324 may be executable by other hardware modules 1980. In certain embodiments, memory 1920 may additionally include secure memory, which may include additional security controls to prevent copying or other unauthorized access to secure information.

In some embodiments, memory 1920 may include an operating system 1925 loaded therein. Operating system 1925 may be operable to initiate the execution of the instructions provided by application modules 1922-1324 and/or manage other hardware modules 1980 as well as interfaces with a wireless communication subsystem 1930 which may include one or more wireless transceivers. Operating system 1925 may be adapted to perform other operations across the components of electronic system 1900 including threading, resource management, data storage control and other similar functionality.

Wireless communication subsystem 1930 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 1900 may include one or more antennas 1934 for wireless communication as part of wireless communication subsystem 1930 or as a separate component coupled to any portion of the system. Depending on desired functionality, wireless communication subsystem 1930 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 1930 may permit data to be exchanged with a network, other computer systems, and/or any other devices described herein. Wireless communication subsystem 1930 may include a means for transmitting or receiving data, such as identifiers of HMD devices, position data, a geographic map, a heat map, photos, or videos, using antenna(s) 1934 and wireless link(s) 1932. Wireless communication subsystem 1930, processor (s) 1910, and memory 1920 may together comprise at least a part of one or more of a means for performing some functions disclosed herein.

Embodiments of electronic system 1900 may also include one or more sensors 1990. Sensor(s) 1990 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 1990 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the MID device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 1900 may include a display module 1960. Display module 1960 may be a near-eye display system, and may graphically present information, such as images, videos, and various instructions, from electronic system 1900 to a user. Such information may be derived from one or more application modules 1922-1324, virtual reality engine 1926, one or more other hardware modules 1980, a combination thereof, or any other suitable means for resolving graphical content for the user (e.g., by operating system 1925). Display module 1960 may use liquid crystal display (LCD) technology, light-emitting diode (LED) technology (including, for example, OLED, ILED, mLED, AMOLED, TOLED, etc.), light emitting polymer display (LPD) technology, or some other display technology.

Electronic system 1900 may include a user input/output module 1970. User input/output module 1970 may allow a user to send action requests to electronic system 1900. An action request may be a request to perform a particular action. For example, an action request may be to start or end an application or to perform a particular action within the application. User input/output module 1970 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 1900. In some embodiments, user input/output module 1970 may provide haptic feedback to the user in accordance with instructions received from electronic system 1900. For example, the haptic feedback may be provided when an action request is received or has been performed.

Electronic system 1900 may include a camera 1950 that may be used to take photos or videos of a user, for example, for tracking the user's eye position. Camera 1950 may also be used to take photos or videos of the environment, for example, for VR, AR, or MR applications. Camera 1950 may include, for example, a complementary metal-oxide-semiconductor (CMOS) image sensor with a few millions or tens of millions of pixels. In some implementations, camera 1950 may include two or more cameras that may be used to capture 3-D images.

In some embodiments, electronic system 1900 may include a plurality of other hardware modules 1980. Each of other hardware modules 1980 may be a physical module within electronic system 1900. While each of other hardware modules 1980 may be permanently configured as a structure, some of other hardware modules 1980 may be temporarily configured to perform specific functions or temporarily activated. Examples of other hardware modules 1980 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 1980 may be implemented in software.

In some embodiments, memory 1920 of electronic system 1900 may also store a virtual reality engine 1926. Virtual reality engine 1926 may execute applications within electronic system 1900 and receive position information, acceleration information, velocity information, predicted future positions, or some combination thereof of the HMD device from the various sensors. In some embodiments, the information received by virtual reality engine 1926 may be used for producing a signal (e.g., display instructions) to display module 1960. For example, if the received information indicates that the user has looked to the left, virtual reality engine 1926 may generate content for the HMD device that mirrors the user's movement in a virtual environment. Additionally, virtual reality engine 1926 may perform an action within an application in response to an action request received from user input/output module 1970 and provide feedback to the user. The provided feedback may be visual, audible, or haptic feedback. In some implementations, processor(s) 1910 may include one or more GPUs that may execute virtual reality engine 1926.

In various implementations, the above-described hardware and modules may be implemented on a single device or on multiple devices that can communicate with one another using wired or wireless connections. For example, in some implementations, some components or modules, such as GPUs, virtual reality engine 1926, and applications (e.g., tracking application), may be implemented on a console separate from the head-mounted display device. In some implementations, one console may be connected to or support more than one HMD.

In alternative configurations, different and/or additional components may be included in electronic system 1900. Similarly, functionality of one or more of the components can be distributed among the components in a manner different from the manner described above. For example, in some embodiments, electronic system 1900 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. An eye-tracking system comprising:
  one or more light sources configured to emit illumination light invisible to a user's eye for illuminating the user's eye;
  a camera configured to detect the illumination light; and
  a substrate transparent to visible light and configured to be placed in front of the user's eye, the substrate comprising:
    a first light deflector in a first region of the substrate, the first light deflector configured to receive a first portion of the illumination light reflected by the user's eye and reflect the received first portion of the illumination light to a first direction towards the camera to form a first image of the user's eye in a first area of an image frame, the first image including one or more glints corresponding to the one or more light sources; and
    a second light deflector in a second region of the substrate, the second region different from the first region, the second light deflector configured to receive a second portion of the illumination light reflected by the user's eye and reflect the received second portion of the illumination light to a second direction towards the camera to form a second image of the user's eye in a second area of the image frame, and the second image including one or more glints corresponding to the one or more light sources.

2. The eye-tracking system of claim 1, wherein each of the first light deflector and the second light deflector comprises:
a reflective Fresnel lens;
a Fresnel mirror;
a dichroic mirror;
a reflective grating;
a diffractive optical element;
a holographic optical element; or
a reflective thin film coating.

3. The eye-tracking system of claim 1, wherein the first light deflector or the second light deflector includes:
a Fresnel lens formed on a surface of the substrate, the Fresnel lens having a spherical, aspherical, cylindrical, or free-formed shape; and
a reflective coating on the Fresnel lens, the reflective coating configured to reflect the light invisible to the user's eye and transmit the visible light.

4. The eye-tracking system of claim 1, wherein the first light deflector and the second light deflector are in a field of view of the user's eye.

5. The eye-tracking system of claim 1, wherein the first light deflector and the second light deflector are in different areas of a surface of the substrate.

6. The eye-tracking system of claim 1, wherein:
the first light deflector and the second light deflector are on a same surface of the substrate;
the first light deflector includes a first plurality of zones;
the second light deflector includes a second plurality of zones; and
the first plurality of zones is interleaved with the second plurality of zones.

7. The eye-tracking system of claim 6, wherein the first plurality of zones and the second plurality of zones include rectangular zones or ring-shaped zones.

8. The eye-tracking system of claim 1, wherein:
the substrate includes multiple layers; and
the first light deflector and the second light deflector are on different layers of the substrate.

9. The eye-tracking system of claim 1, wherein:
the one or more light sources include at least two light sources; and
each image of the first image and the second image includes at least two glints, each glint corresponding to a light source of the at least two light sources.

10. The eye-tracking system of claim 1, wherein the substrate includes a curved or a flat surface.

11. The eye-tracking system of claim 1, wherein the substrate comprises at least one of a glass, quartz, plastic, polymer, ceramic, or crystal material.

12. The eye-tracking system of claim 1, wherein the one or more light sources and the camera are positioned in a peripheral region of a field of view of the user's eye.

13. The eye-tracking system of claim 1, wherein the one or more light sources are configured to emit illumination light in a near infrared range.

14. The eye-tracking system of claim 1, wherein:
the eye-tracking system is a part of a near-eye display system that includes a frame; and
the one or more light sources and the camera are positioned on the frame.

15. A display device comprising:
a waveguide-based display substrate transparent to visible light and configured to be placed in front of a user's eye, the waveguide-based display substrate comprising:
a first light deflector in a first region of the waveguide-based display substrate, the first light deflector configured to receive a first portion of invisible light reflected by the user's eye and reflect the received first portion of the invisible light to a first direction towards a camera to form a first image of the user's eye in a first area of an image frame; and
a second light deflector in a second region of the waveguide-based display substrate, the second region different from the first region, and the second light deflector configured to receive a second portion of the invisible light reflected by the user's eye and reflect the received second portion of the invisible light to a second direction towards the camera to form a second image of the user's eye in a second area of the image frame.

16. The display device of claim 15, wherein each of the first light deflector and the second light deflector comprises:
a reflective Fresnel lens;
a Fresnel mirror;
a dichroic mirror;
a reflective grating;
a diffractive optical element;
a holographic optical element; or
a reflective thin film coating.

17. The display device of claim 15, wherein the first light deflector and the second light deflector are on different areas of a surface of the waveguide-based display substrate.

18. A method of tracking an eye of a user of a near-eye display system, the method comprising:
illuminating, by invisible light emitted from one or more light sources, the eye of the user;
receiving, by a substrate of the near-eye display system positioned in front of the eye of the user, the invisible light reflected by the eye of the user;
reflecting, by a first light deflector in a first region of the substrate, a first portion of the invisible light reflected by the eye of the user and received by the substrate to a first direction towards a camera to form a first image of the eye of the user in a first area of an image frame, the first image including one or more glints corresponding to the one or more light sources; and
reflecting, by a second light deflector in a second region of the substrate, a second portion of the invisible light reflected by the eye of the user and received by the substrate to a second direction towards the camera to form a second image of the eye of the user in a second area of the image frame, the second image including one or more glints corresponding to the one or more light sources, wherein the second region is different from the first region.

19. The method of claim 18, further comprising:
determining a gaze direction of the eye of the user based on the first image and the second image in the image frame.

20. The method of claim 18, further comprising:
determining regions of interest in the image frame, wherein the regions of interest include one or more glints in each of the first image and the second image; and
capturing subsequent image frames including only the regions of interest.

* * * * *